United States Patent
Watanabe

(10) Patent No.: US 10,193,629 B2
(45) Date of Patent: Jan. 29, 2019

(54) OPTICAL-SIGNAL PROCESSING APPARATUS, OPTICAL TRANSMISSION METHOD, RECEIVER, AND OPTICAL NETWORK SYSTEM

(71) Applicant: FUJITSU LIMITED, Kawasaki-shi, Kanagawa (JP)

(72) Inventor: Shigeki Watanabe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 388 days.

(21) Appl. No.: 14/853,371

(22) Filed: Sep. 14, 2015

(65) Prior Publication Data
US 2016/0006508 A1   Jan. 7, 2016

Related U.S. Application Data

(62) Division of application No. 13/064,295, filed on Mar. 16, 2011, now Pat. No. 9,182,649.

(30) Foreign Application Priority Data

Mar. 19, 2010   (JP) .................................. 2010-063569
Feb. 15, 2011   (JP) .................................. 2011-029626

(51) Int. Cl.
*H04B 10/2575* (2013.01)
*H04B 10/2557* (2013.01)
(Continued)

(52) U.S. Cl.
CPC ......... *H04B 10/2557* (2013.01); *G02F 1/365* (2013.01); *G02F 2/004* (2013.01);
(Continued)

(58) Field of Classification Search
CPC ........ H04J 14/02; H04J 14/00; H04J 14/0216; H04J 14/0276; G02F 1/3536;
(Continued)

(56) References Cited

U.S. PATENT DOCUMENTS

| 4,953,156 A | 8/1990 | Olshansky et al. |
| 5,515,192 A * | 5/1996 | Watanabe ............ H04B 10/071 359/334 |

(Continued)

FOREIGN PATENT DOCUMENTS

| JP | 8-29817 | 2/1996 |
| JP | 2001-251250 | 9/2001 |

(Continued)

OTHER PUBLICATIONS

European Office Action dated Dec. 7, 2016 in corresponding European Patent Application No. 11 158 639.2.

(Continued)

*Primary Examiner* — David C Payne
*Assistant Examiner* — Tanya T Motsinger
(74) *Attorney, Agent, or Firm* — Staas & Halsey LLP

(57) ABSTRACT

In an optical network system: control light is generated by optical modulation based on a modulated data signal which is generated by modulation of a carrier signal with a data signal; and the control light is optically combined with an optical carrier which is to propagate through a nonlinear optical medium, so as to cause cross phase modulation of the optical carrier with the control light in the nonlinear optical medium.

1 Claim, 29 Drawing Sheets

(51) Int. Cl.
  *G02F 2/00* (2006.01)
  *H04B 10/516* (2013.01)
  *H04B 10/50* (2013.01)
  *G02F 1/365* (2006.01)
  *H04B 10/079* (2013.01)
  *H04J 14/06* (2006.01)
  *G02F 1/35* (2006.01)

(52) U.S. Cl.
  CPC ... *H04B 10/07955* (2013.01); *H04B 10/5051* (2013.01); *H04B 10/516* (2013.01); *H04J 14/06* (2013.01); *G02F 1/3519* (2013.01)

(58) Field of Classification Search
  CPC ........ G02F 1/3538; G02F 1/353; G02F 2/004; G02F 1/0126; G02F 1/01708
  See application file for complete search history.

(56) References Cited

U.S. PATENT DOCUMENTS

| | | | | |
|---|---|---|---|---|
| 5,596,436 | A * | 1/1997 | Sargis | H04J 14/0298 398/76 |
| 5,596,667 | A * | 1/1997 | Watanabe | G02F 1/3538 372/21 |
| 5,598,289 | A * | 1/1997 | Watanabe | H04B 10/071 359/334 |
| 5,694,239 | A * | 12/1997 | Shigematsu | G02F 1/3538 359/326 |
| 6,137,613 | A * | 10/2000 | Ushirozawa | H04B 10/505 398/1 |
| 6,342,965 | B1 | 1/2002 | Kinoshita | |
| 6,522,818 | B1 * | 2/2003 | Aso | G02B 6/278 359/341.1 |
| 6,798,564 | B2 | 9/2004 | Inoue et al. | |
| 7,106,499 | B2 | 9/2006 | Sekiya | |
| 7,292,791 | B2 | 11/2007 | Sayyah et al. | |
| 7,450,298 | B2 * | 11/2008 | Watanabe | H04B 10/299 359/330 |
| 7,940,454 | B2 * | 5/2011 | Watanabe | G02F 1/395 359/330 |
| 9,287,993 | B1 * | 3/2016 | Adleman | H04B 10/2575 |
| 2002/0093728 | A1 | 7/2002 | Sugaya et al. | |
| 2002/0176152 | A1 | 11/2002 | Parolari et al. | |
| 2002/0186457 | A1 | 12/2002 | Cao | |
| 2003/0058524 | A1 | 3/2003 | Akasaka et al. | |
| 2003/0202797 | A1 * | 10/2003 | Seguineau | H04B 10/2557 398/155 |
| 2004/0190909 | A1 | 9/2004 | Akasaka et al. | |
| 2005/0047799 | A1 * | 3/2005 | Coppinger | H04B 10/2507 398/188 |
| 2006/0018008 | A1 * | 1/2006 | Kinoshita | H01S 3/06725 359/334 |
| 2006/0051100 | A1 * | 3/2006 | Watanabe | H04J 14/08 398/152 |
| 2007/0103766 | A1 * | 5/2007 | Frriedrich | H04B 10/0777 359/341.1 |
| 2007/0230518 | A1 * | 10/2007 | Watanabe | H04B 10/299 372/22 |
| 2007/0292070 | A1 * | 12/2007 | Okabe | G02F 1/3536 385/11 |
| 2008/0145063 | A1 * | 6/2008 | Li | H04B 10/40 398/140 |
| 2010/0046962 | A1 * | 2/2010 | Yu | H04B 10/2575 398/178 |
| 2010/0135656 | A1 * | 6/2010 | Khurgin | H04B 10/61 398/43 |
| 2010/0157417 | A1 * | 6/2010 | Watanabe | G02F 1/39 359/339 |
| 2010/0220376 | A1 * | 9/2010 | Kobayashi | G02F 1/0327 359/238 |
| 2011/0229138 | A1 * | 9/2011 | Watanabe | G02F 2/004 398/79 |
| 2012/0020665 | A1 * | 1/2012 | Watanabe | G02F 1/3515 398/65 |
| 2012/0051743 | A1 * | 3/2012 | Kato | H04J 14/02 398/43 |
| 2012/0189308 | A1 * | 7/2012 | Watanabe | H04B 10/07 398/79 |
| 2012/0301148 | A1 | 11/2012 | Watanabe | |
| 2013/0050795 | A1 | 2/2013 | Qiu et al. | |
| 2013/0051803 | A1 | 2/2013 | Kato et al. | |
| 2013/0084072 | A1 | 4/2013 | Kato et al. | |
| 2013/0223842 | A1 * | 8/2013 | Kato | H04B 10/2507 398/76 |
| 2013/0272709 | A1 | 10/2013 | Watanabe et al. | |
| 2014/0079395 | A1 * | 3/2014 | Effenberger | H04B 10/2537 398/66 |
| 2014/0269784 | A1 | 9/2014 | Kato et al. | |
| 2017/0366267 | A1 * | 12/2017 | Campos | H04B 10/25753 |

FOREIGN PATENT DOCUMENTS

| | | |
|---|---|---|
| JP | 3436310 | 6/2003 |
| JP | 2006-251360 | 9/2006 |
| JP | 2007-133426 | 5/2007 |

OTHER PUBLICATIONS

European Office Action dated Aug. 22, 2017 in corresponding European Patent Application No. 11 158 639.2.
Japanese Office Action dated Jun. 24, 2014 in corresponding Japanese Patent Application No. 2011-029626.
"Analysis of a two-channel 2R all-optical regenerator based on a counter-propagating configuration", Provost et al., Optics Express, vol. 16, No. 3, Feb. 2008, pp. 2264-2275.
"Cross-Phase Modulation in Fiber Links with Multiple Optical Amplifiers and Dispersion Compensators", Chiang et al., Journal of Lightwave Technology, vol. 14, No. 3, Mar. 1996, pp. 249-260.
Extended European Search Report dated Jul. 14, 2011 in Application No. 11158639.2-2415.
Galili et al., "Low Penalty Raman-Assisted XPM Wavelength Conversion AD at 320 Gb/s", CLEO '07, 2007 Conference on Lasers and Electro-optics, May 5-11, 2007 (2 pp).
Forin et al., "Ultrawide Bandwith λ-Converter With Regeneration Properties Based on Cross Phase Modulation Effect in Highly Non Linear Dispersion Flattened Fiber", Optical Fiber Communication Conference and Exposition National Fiber Optic Engineers Conference, OFCNFOEC 2007, IEEE, Mar. 25-29, 2007 (3 pp).
Weiming Mao et al., "All-Optical Wavelength Conversion Based on Periodic Phase Modulation in Optical Fibers", Lasers and Electro-optics Conference 2004, CLEO, May 20-21, 2004, IEEE, vol. 2, May 20, 2004 (pp. 852-853).
English Abstract of WO 94/09403, Published Apr. 28, 1994.
Restriction Requirement dated Apr. 29, 2013 from U.S. Appl. No. 13/064,295.
Office Action dated Jun. 21, 2013 from U.S. Appl. No. 13/064,295.
Office Action dated Jan. 29, 2014 from U.S. Appl. No. 13/064,295.
Notice of Allowance dated Aug. 11, 2015 from U.S. Appl. No. 13/064,295.
U.S. Appl. No. 13/064,295, filed Mar. 16, 2011, Shigeki Watanabe, Fujitsu Limited.
European Office Action dated Apr. 28, 2016 in corresponding European Application No. 11 158 639.2.
Song et al., "Simultaneous All-Optical Frequency Downconversion Technique Utilizing an SOA-MZI for WDM Radio Over Fiber (RoF) Applications", Journal of Lightwave Technology, vol. 24, No. 8, Aug. 1, 2006, pp. 3028-3034.

* cited by examiner

OPTICAL-SIGNAL PROCESSING APPARATUS, OPTICAL TRANSMISSION METHOD, RECEIVER, AND OPTICAL NETWORK SYSTEM

CROSS-REFERENCE TO RELATED APPLICATIONS

This application is a divisional of U.S. patent application Ser. No. 13/064,295, filed on Mar. 16, 2011, which is currently pending, and claims the benefits of priority of the prior Japanese Patent Application No. 2010-063569, filed on Mar. 19, 2010, and the Japanese Patent Application No. 2011-029626, filed on Feb. 15, 2011, the entire contents of which are incorporated herein by reference.

FIELD

The embodiments discussed herein relate to optical-signal processing apparatuses which realize information multiplexing on an optical carrier, an optical transmission method in which information multiplexing is realized on an optical carrier, a receiver which receives and demodulates a modulated optical carrier, and optical network systems in which information multiplexing is realized on an optical carrier.

BACKGROUND

The optical networks in the future are required, for example, to be formed over a conventional optical communication system, and to allow processing for inserting, dropping, and switching control light in devices (such as optical repeater nodes) remote from terminal stations. At this time, from the viewpoint of the efficient energy use, it is effective to minimize the number of conversions between optical signals and electric signals during propagation and processing of information.

In the currently used optical repeater nodes and the like, signals are processed by using conversions between optical signals and electric signals as in the terminal stations. For example, control light transmitted to an optical repeater node or the like is once converted into an electric signal, is then electrically processed, and is thereafter converted into an optical signal. Therefore, the equipment construction is complex, and great electric power is needed for compensating for loss caused by the conversions between optical signals and electric signals.

In addition, conventionally, a repeater station which uses phase-conjugate light, is arranged between a transmitter station and a receiver station, and is connected to the transmitter station and the receiver station through an optical transmission line is disclosed, for example, in Japanese Registered Patent No. 3436310. The repeater station contains a phase-conjugate-light generating device and a modulation means. The phase-conjugate-light generating device contains a control-light/excitation-light supply means and a control-light/phase-conjugate-light extraction means. The control-light/excitation-light supply means supplies to a nonlinear optical medium excitation light and inputted control light which is transmitted from the transmitter station, and the control-light/phase-conjugate-light extraction means extracts output control light and phase-conjugate light which are generated by the nonlinear optical medium in response to the inputted control light and the excitation light. The modulation means modulates the excitation light with monitor data unique to the repeater station. The repeater station transmits the phase-conjugate light to the receiver station, where the phase-conjugate light contains the modulated monitor data.

However, in the case where data is inserted into and transmitted through the conventional optical networks, data are collected in a terminal station or optical repeater nodes arranged at a plurality of specific positions, and are then respectively transmitted by use of dedicated light waves.

SUMMARY

According to an aspect of the present invention, an optical-signal processing apparatus is provided. The optical-signal processing apparatus includes: a modulated-data-signal obtaining unit which obtains a modulated data signal, which is generated by modulating a carrier signal with a data signal; and an optical modulator which performs optical modulation on the basis of the modulated data signal, and generates control light to be optically combined with an optical carrier being to propagate through a nonlinear optical medium for causing cross phase modulation of the optical carrier in the nonlinear optical medium.

The optical-signal processing apparatuses, the optical transmission method, the receivers, and the optical network systems disclosed in this specification facilitate transmission of information from an arbitrary position in an optical network.

The object and advantages of the invention will be realized and attained by means of the elements and combinations particularly pointed out in the claims.

It is to be understood that both the forgoing general description and the following detailed description are exemplary and explanatory and are not restrictive of the invention, as claimed.

DESCRIPTION OF EMBODIMENTS

The embodiments will be explained below with reference to the accompanying drawings, wherein like reference numbers refer to like elements throughout.

1. First Embodiment

Figure 1:
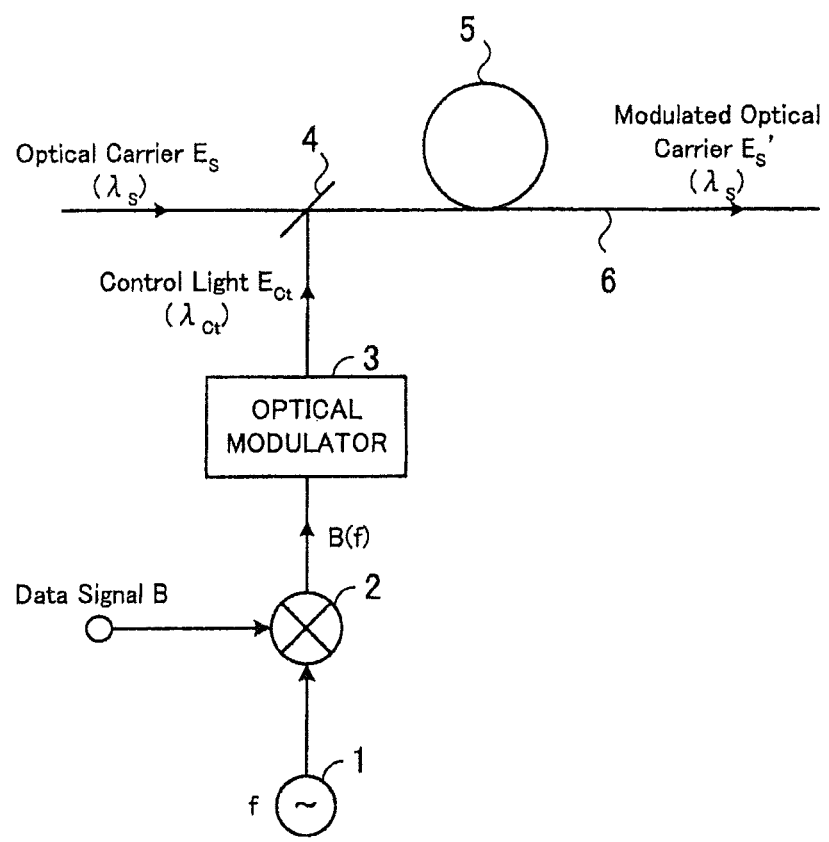
FIG. 1 illustrates an optical-signal processing apparatus according to a first embodiment.

An optical-signal processing apparatus according to the first embodiment is explained below. FIG. 1 illustrates the optical-signal processing apparatus according to the first embodiment. The optical-signal processing apparatus of FIG. 1 comprises an oscillator 1, a multiplier 2, and an optical modulator 3. In addition, an optical combiner 4 and a nonlinear optical medium 5 are arranged in an optical transmission line 6, so that an optical carrier $E_S$ having the wavelength $\lambda_S$ and propagating through the optical transmission line 6 passes through the optical combiner 4 and the nonlinear optical medium 5. The optical transmission line 6 is realized by, for example, an optical fiber. The optical carrier $E_S$ is, for example, continuous-wave (CW) light or control light modulated with an information (data) signal. The nonlinear optical medium 5 is, for example, a portion of the optical fiber realizing the optical transmission line 6. Alternatively, the nonlinear optical medium 5 may be a nonlinear optical fiber in which a nonlinear optical effect is enhanced. The optical combiner 4 optically combines the optical carrier $E_S$ and control light $E_{Ct}$ which is outputted from the optical modulator 3 as explained below.

The oscillator 1 generates a carrier signal having a RF (radio frequency) frequency. The carrier signal generated by the oscillator 1 and a data signal B (which represents information to be transmitted by multiplexing onto the optical carrier $E_S$) are inputted into the multiplier 2, the multiplier 2 modulates the inputted carrier with the inputted data signal B, so that a modulated signal B(f) is generated and outputted to the optical modulator 3. The optical modulator 3 receives the modulated signal B(f) and outputs the control light $E_{Ct}$ corresponding to the modulated signal B(f), where the control light $E_{Ct}$ has the wavelength $\lambda_{Ct}$, which is different from the wavelength $\lambda_S$ of the optical carrier $E_S$.

As mentioned above, the optical combiner 4 optically combines the optical carrier $E_S$ (which is to propagate through the nonlinear optical medium 5) and the control light $E_{Ct}$ (which is outputted from the optical modulator 3). The optical combiner 4 is, for example, an optical coupler. When the optical carrier $E_S$ and the control light $E_{Ct}$ are optically combined by the optical combiner 4, the optical carrier $E_S$ undergoes cross phase modulation (XPM) with the control light $E_{Ct}$ in the nonlinear optical medium 5, so that modulated optical carrier $E_S'$ having the wavelength $\lambda_S$ is outputted from the nonlinear optical medium 5, where the degree (magnitude) of XPM is proportional to the power of the control light $E_{Ct}$.

As explained above, in the nonlinear optical medium 5 in the optical-signal processing apparatus of FIG. 1, the optical carrier $E_S$ undergoes cross phase modulation with the control light $E_{Ct}$ (which is optically modulated on the basis of the modulated data signal B). Therefore, the optical-signal processing apparatus of FIG. 1 can multiplex the data signal B on the optical carrier $E_S$ propagating in the optical network, and enables transmission of the data signal B from an arbitrary place in the optical network.

In addition, the polarization states of the control light $E_{Ct}$ and the optical carrier $E_S$ inputted into the optical combiner 4 may be adjusted so as to realize desirable cross phase modulation. For example, the polarization states of the control light $E_{Ct}$ and the optical carrier $E_S$ may be adjusted so as to coincide. Alternatively, it is possible to use a polarization diversity technique in which approximately identical degrees of cross phase modulation are applied to each pair of orthogonal polarizations.

The degree of cross phase modulation realized when the polarization of the control light $E_{Ct}$ is orthogonal to the polarization of the optical carrier $E_S$ is approximately ⅓ (−2 dB) lower than the degree of cross phase modulation realized when the polarization states of the control light $E_{Ct}$ and the optical carrier $E_S$ coincide. Therefore, in the case where the polarization of the control light $E_{Ct}$ is orthogonal to the polarization of the optical carrier $E_S$, it is possible to compensate for the reduction in the degree of cross phase modulation by using a compensation circuit, a digital-signal processing circuit, or the like in a receiver after the optical carrier $E_S$ is converted into an electric signal and the electric signal is demodulated into the data signal B.

2. Second Embodiment

Figure 2:
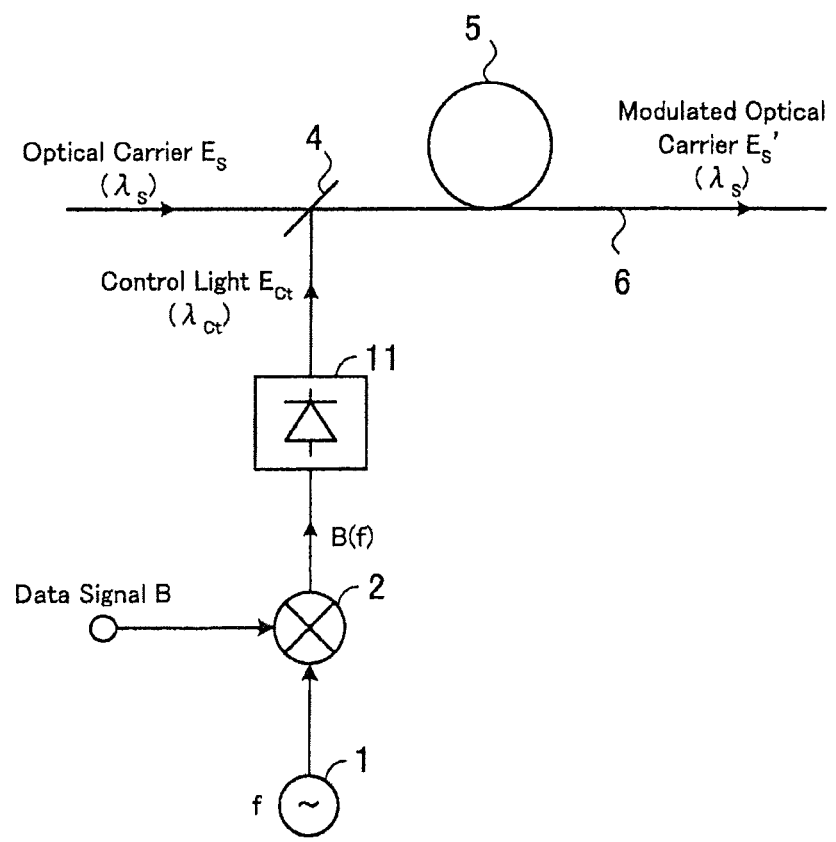
FIG. 2 illustrates an optical-signal processing apparatus according to a second embodiment.

An optical-signal processing apparatus according to the second embodiment is explained below. FIG. 2 illustrates the optical-signal processing apparatus according to the second embodiment, which is a concrete example of the first embodiment. In the optical-signal processing apparatus according to the second embodiment, the optical modulator 3 in the first embodiment is realized by a laser diode (LD) 11, and the modulated signal B(f) is a driving current inputted into the LD 11 for direct optical modulation. The LD 11 outputs the control light $E_{Ct}$ (optically modulated on the basis of the modulated data signal B).

As explained above, in the optical-signal processing apparatus of FIG. 2, the LD 11 outputs the control light $E_{Ct}$, and the optical carrier $E_S$ undergoes cross phase modulation with the control light $E_{Ct}$ in the nonlinear optical medium 5. Therefore, the optical-signal processing apparatus of FIG. 2 enables transmission of the data signal B from an arbitrary place in the optical network.

3. Third Embodiment

Figure 3:
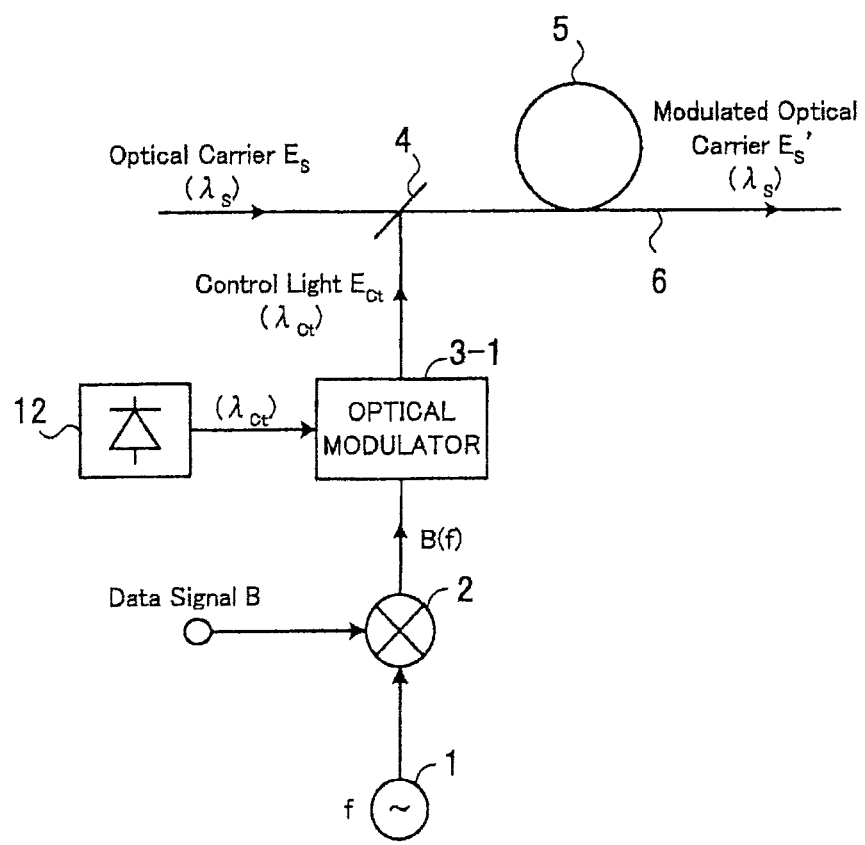
FIG. 3 illustrates an optical-signal processing apparatus according to a third embodiment.

An optical-signal processing apparatus according to the third embodiment is explained below. FIG. 3 illustrates the optical-signal processing apparatus according to the third embodiment, which is another concrete example of the first embodiment. In the optical-signal processing apparatus according to the third embodiment, the optical modulator 3 in the first embodiment is realized by an external optical modulator 3-1 and a light source 12.

The light source 12 is a laser diode (LD) which emits light having the wavelength $\lambda_{Ct}$. The light emitted from the light source 12 and the modulated data signal B(f) outputted from the multiplier 2 are inputted into the external optical modulator 3-1. The external optical modulator 3-1 modulates the light emitted from the light source 12 with the modulated data signal B(f), and outputs the control light $E_{Ct}$ having the wavelength $\lambda_{Ct}$ to the optical combiner 4. For example, the external optical modulator 3-1 may be a Mach-Zehnder modulator or an LN (lithium niobate) modulator.

As explained above, in the optical-signal processing apparatus of FIG. 3, the control light $E_{Ct}$ are obtained by the optical modulation using the light source 12 and the external optical modulator 3-1. In the case where the bandwidth of the external optical modulator 3-1 is wide, it is possible to expect that the optical-signal processing apparatus of FIG. 3 can output the control light $E_{Ct}$ in response to modulated signals B(f) having higher frequencies than the optical-signal processing apparatus of FIG. 2, in which the optical modulator (the LD 11) is directly modulated. However, the optical-signal processing apparatus of FIG. 2 can be constructed with a smaller number of components than the optical-signal processing apparatus of FIG. 3. Therefore, the optical-signal processing apparatus of FIG. 2 can be constructed at lower cost than the optical-signal processing apparatus of FIG. 3.

4. Fourth Embodiment

Figure 4:
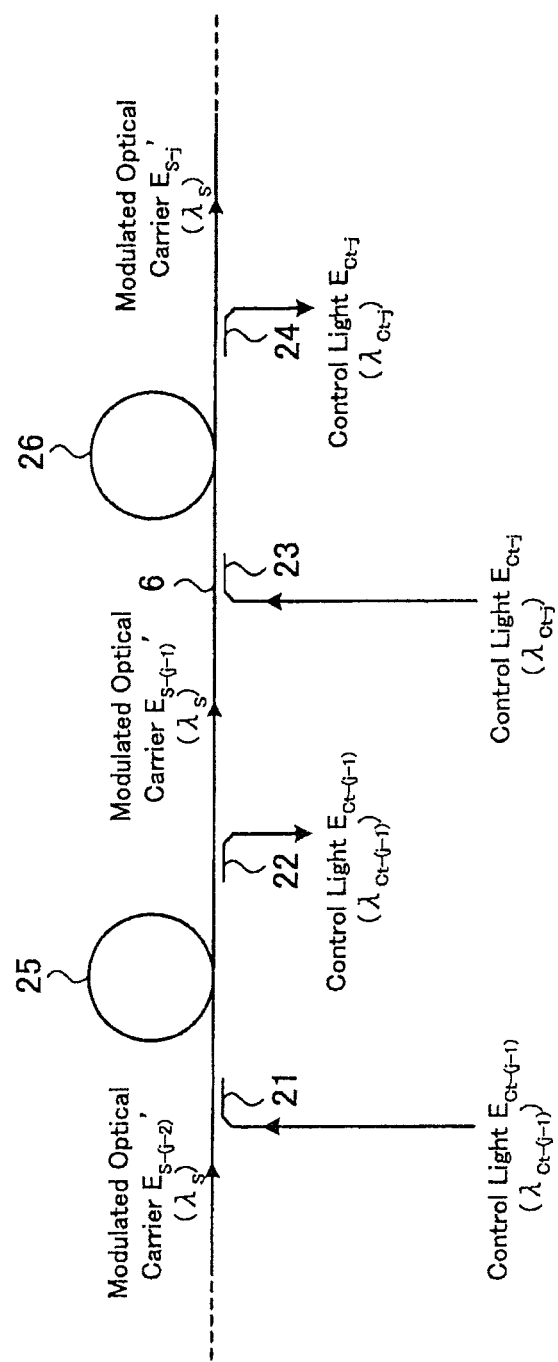
FIG. 4 illustrates an optical network system according to a fourth embodiment.

An optical network system according to the fourth embodiment is explained below. In the fourth embodiment, a plurality of optical-signal processing apparatuses are connected to an optical network, and data signals are transmitted through the optical network by using optical frequency-division multiplexing. FIG. 4 partially illustrates the optical network system according to the fourth embodiment. In FIG. 4, optical combiners 21 and 23, optical splitters 22 and 24, and nonlinear optical mediums 25 and 26 are arranged in an optical transmission line 6. Each of the optical combiners 21 and 23 is the optical combiner in one of the optical-signal processing apparatuses illustrated in FIGS. 1, 2, and 3. That is, the construction being constituted by the oscillator 1, the multiplier 2, and the optical modulator 3 and supplying the control light to the optical combiner in the one of the optical-signal processing apparatuses illustrated in FIGS. 1, 2, and 3 is connected to each of the optical combiners 21 and 23, although not shown in FIG. 4. Each of the optical combiners 21 and 23 and the optical splitters 22 and 24 may be realized by, for example, a WDM (wavelength-division multiplexing) coupler. Each of the nonlinear optical mediums 25 and corresponds to the nonlinear optical medium 5 illustrated in one of FIGS. 1, 2, and 3. Further, in FIG. 4, it is assumed that the optical-signal processing apparatus connected to the optical combiner is located at the (j−1)-th point in the optical network, and the optical-signal processing apparatus connected to the optical combiner 23 is located at the j-th point in the optical network.

Control light $E_{Ct-(j-1)}$ having the wavelength $\lambda_{Ct-(j-1)}$ is inputted into the optical combiner 21. The optical combiner 21 optically combines the control light $E_{Ct-(j-1)}$ with modulated optical carrier $E_{S-(j-2)}'$ which has the wavelength $\lambda_S$ and propagates through the optical transmission line 6 (in which the nonlinear optical medium 25 is arranged). Thus, the modulated optical carrier $E_{S-(j-2)}'$ undergoes cross phase modulation with the control light $E_{Ct-(j-1)}$ in the nonlinear optical medium 25, so that modulated optical carrier $E_{S-(j-2)}'$ having the wavelength $\lambda_S$ and the control light $E_{Ct-(j-1)}$ are outputted from the nonlinear optical medium 25. The optical splitter 22 splits the control light $E_{Ct-(j-1)}$ from the output of the nonlinear optical medium 25. That is, the optical splitter 22 prevents propagation, beyond the optical splitter 22 to the nonlinear optical medium 26, of the control light $E_{Ct-(j-1)}$ which is optically combined with the modulated optical carrier $E_{S-(j-2)}'$ by the optical combiner 21.

Control light $E_{Ct-j}$ having the wavelength $\lambda_{Ct-j}$ is inputted into the optical combiner 23. The optical combiner 23 optically combines the control light $E_{Ct-j}$ with modulated optical carrier $E_{S-(j-1)}'$ which has the wavelength $\lambda_S$ and propagates through the optical transmission line 6. Thus, the modulated optical carrier $E_{S-(j-1)}'$ undergoes cross phase modulation with the control light $E_{Ct-j}$ in the nonlinear optical medium 26, so that modulated optical carrier $E_{S-(j-1)}'$ having the wavelength $\lambda_S$ and the control light $E_{Ct-j}$ are outputted from the nonlinear optical medium 26. The optical splitter 24 splits the control light $E_{Ct-j}$ from the output of the nonlinear optical medium 26. That is, the optical splitter 24 prevents propagation, beyond the optical splitter 24 to a nonlinear optical medium in the following stage, of the control light $E_{Ct-J}$ which is optically combined with the modulated optical carrier $E_{S-(j-1)}'$ by the optical combiner 23.

Figure 5A:
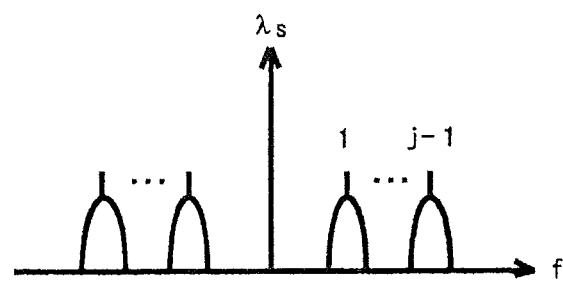
FIGS. 5A and 5B indicate the spectra of modulated optical carriers propagating through the optical network of FIG. 4.
Figure 5B:
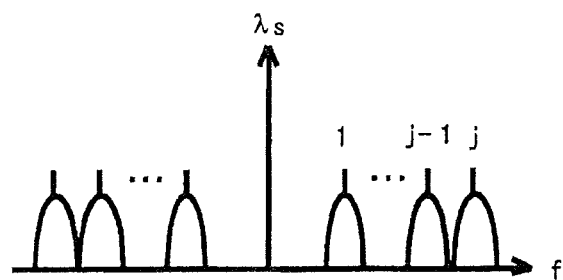

FIGS. 5A and 5B indicate the spectra of modulated optical carriers propagating through the optical network of FIG. 4. Specifically, FIG. 5A indicates the allocation of the frequencies of the modulated optical carrier $E_{S-(j-1)}'$ in the stage following the optical splitter 22, and FIG. 5B indicates the allocation of the frequencies of the modulated optical carrier $E_{S-j}'$ in the stage following the optical splitter 24. In FIGS. 5A and 5B, the subband being added in the modulated optical carrier $E_{S-(j-1)}'$ and carrying the j-th modulated data signal is indicated by the reference "j−1", and the subband being added in the modulated optical carrier $E_{S-j}'$ and carrying the j-th modulated data signal is indicated by the reference "j".

The carrier frequency (i.e., the frequency of the carrier signal) of the optical-signal processing apparatus located at the (j−1)-th point (i.e., the position of the optical combiner 21 illustrated in FIG. 4) is different from the carrier frequency of the optical-signal processing apparatus located at the j-th point (i.e., the position of the optical combiner 23 illustrated in FIG. 4). Therefore, for example, the modulated optical carrier $E_{S-j}'$ carries the information corresponding to the j-th data signal in the subband "j" in addition to the information carried by the modulated optical carrier $E_{S-(j-1)}'$. In other words, when an optical-signal processing apparatus having a different carrier frequency is arranged in the optical network in which an optical carrier propagates, it is possible to add to the optical carrier a subband carrying the j-th data signal and corresponding to the carrier frequency $f_j$ (i.e., the frequency of the carrier signal of the optical-signal processing apparatus located at the j-th point).

As explained above, the above arrangement, in the optical network, of the plurality of optical-signal processing apparatuses having respectively different carrier frequencies enables optical frequency-division multiplexing, on a single optical carrier, of information (data signals) from the plurality of optical-signal processing apparatuses. That is, a plurality of data signals can be readily transmitted from a plurality of arbitrary places without providing more than one optical fiber or more than one optical carrier having more than one wavelength.

5. Fifth Embodiment

Figure 6:
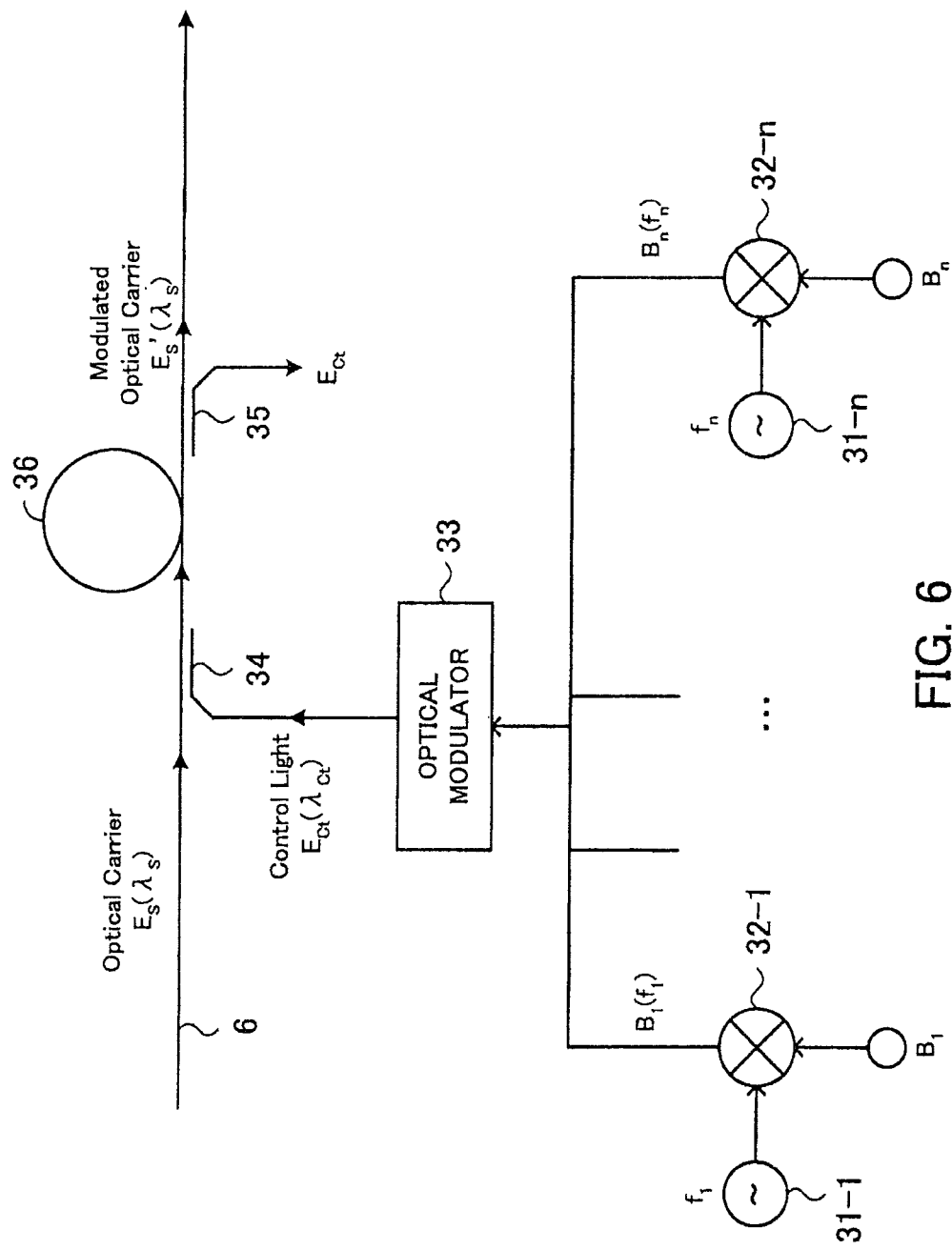
FIG. 6 illustrates an optical-signal processing apparatus according to a fifth embodiment.

An optical-signal processing apparatus according to the fifth embodiment is explained below. The optical-signal processing apparatus according to the fifth embodiment enables transmission of a plurality of data signals from each optical-signal processing apparatus through an optical network. FIG. 6 illustrates the optical-signal processing apparatus according to the fifth embodiment.

The optical-signal processing apparatus of FIG. 6 comprises oscillators 31-1 to 31-n, multipliers 32-1 to 32-n, and an optical modulator 33. In addition, an optical combiner 34, an optical splitter 35, and a nonlinear optical medium 36 are arranged in an optical transmission line 6, and the optical carrier $E_S$ having the wavelength $\lambda_S$ and propagating through the optical transmission line 6 passes through the optical combiner 34, the optical splitter 35, and the nonlinear optical medium 36. The optical transmission line 6 is realized by, for example, an optical fiber. The nonlinear optical medium 36 is, for example, a portion of the optical fiber realizing the optical transmission line 6. Alternatively, the nonlinear optical medium 36 may be a nonlinear optical fiber in which a nonlinear optical effect is enhanced. The optical combiner 34 optically combines the optical carrier $E_S$ and control light $E_{Ct}$ which is outputted from the optical modulator 33 as explained below. Each of the optical combiner 34 and the optical splitter 35 may be realized by, for example, a WDM (wavelength-division multiplexing) coupler.

The oscillators 31-1 to 31-n output to the multipliers 32-1 to 32-n n carrier signals (subcarrier signals in n channels) having different RF frequencies $f_1$ to $f_n$, respectively. A plurality of data signals $B_1$ to $B_n$ each representing information to be transmitted through the optical transmission line 6 are inputted into the multipliers 32-1 to 32-n, respectively. The multipliers 32-1 to 32-n modulate the subcarrier signals with the data signals $B_1$ to $B_n$, respectively, and obtain and combine a plurality of subcarrier-modulated data signals $B_1(f_1)$ to $B_n(f_n)$. The combined, subcarrier-modulated data signals are outputted to the optical modulator 33. The optical modulator 33 receives the combined, subcarrier-modulated data signals $B_1(f_1)$ to $B_n(f_n)$, generates control light $E_{Ct}$ having the wavelength $\lambda_{Ct}$ and carrying (being optically modulated on the basis of) the subcarrier-modulated data signals $B_1(f_1)$ to $B_n(f_n)$, and outputs the control light $E_{Ct}$ to the optical combiner 34. The optical modulator 33 is, for example, the LD 11 illustrated in FIG. 2, or the external optical modulator 3-1 illustrated in FIG. 3. The wavelength $\lambda_{Ct}$ of the control light $E_{Ct}$ is different from the wavelength $\lambda_S$ of the optical carrier $E_S$.

The optical combiner 34 optically combines the control light $E_{Ct}$ with the optical carrier $E_S$ propagating through the optical transmission line 6 (connected to the nonlinear optical medium 36). When the optical carrier $E_S$ and the control light $E_{Ct}$ are optically combined by the optical combiner 34, the optical carrier $E_S$ undergoes cross phase modulation (XPM) with the control light $E_{Ct}$ in the nonlinear optical medium 36, so that modulated optical carrier $E_S'$ having the wavelength $\lambda_S$ is outputted from the nonlinear optical medium 36, where the degree of XPM is proportional to the power of the control light $E_{Ct}$.

The optical splitter 35 splits the control light $E_{Ct}$ from the output of the nonlinear optical medium 36. That is, the optical splitter 35 prevents propagation, beyond the optical splitter 35 to a nonlinear optical medium in the following stage, of the control light $E_{Ct}$ which is optically combined with the modulated optical carrier $E_S'$ by the optical combiner 34.

As explained above, the optical-signal processing apparatus according to the fifth embodiment enables cross phase modulation of the optical carrier $E_S$ propagating through the optical transmission line 6, with the control light $E_{Ct}$ which is optically modulated on the basis of the plurality of subcarrier-modulated signals $B_1(f_1)$ to $B_n(f_n)$. Therefore, the optical-signal processing apparatus according to the fifth embodiment can transmit a plurality of data signals from arbitrary places.

6. Sixth Embodiment

Figure 7:
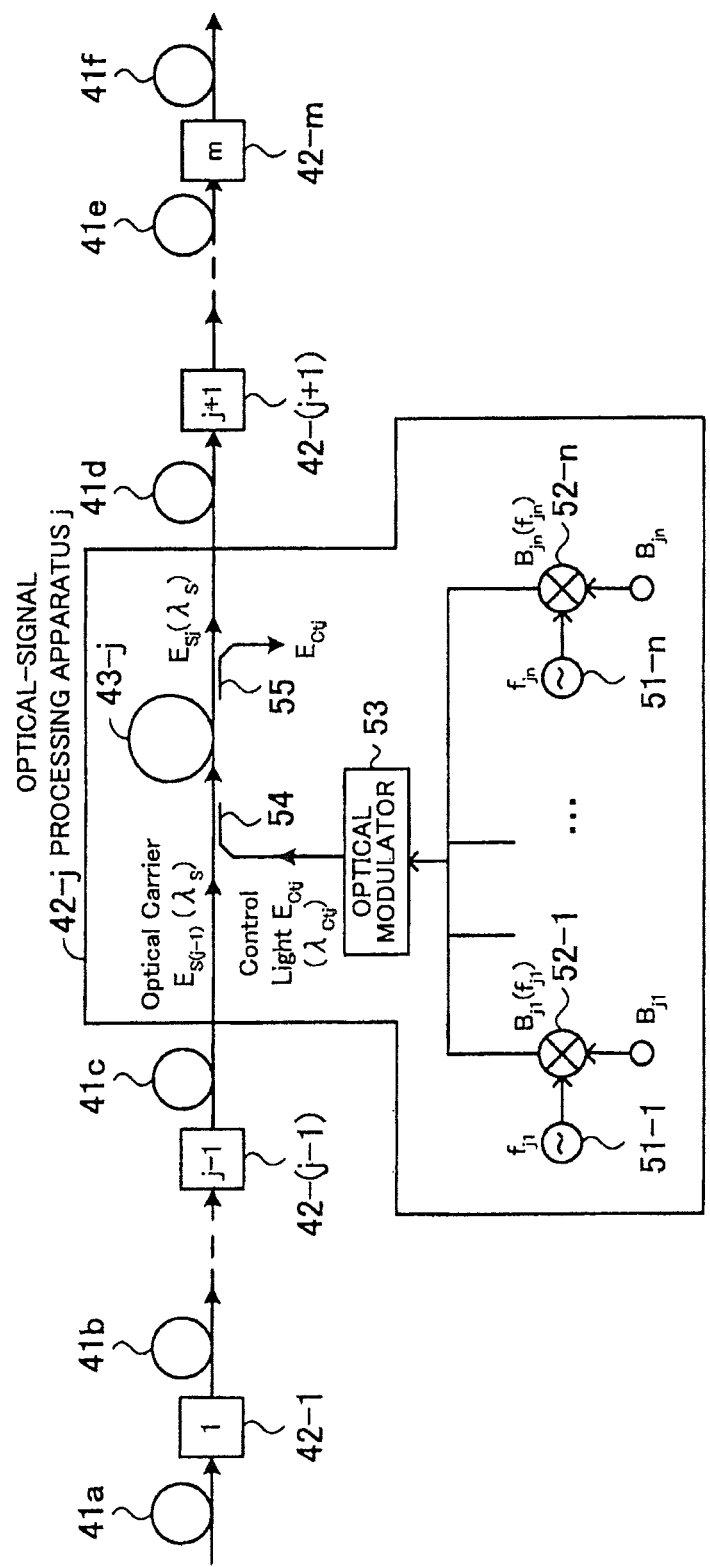
FIG. 7 illustrates an optical network system according to a sixth embodiment.

An optical network system according to the sixth embodiment is explained below. In the sixth embodiment, a plurality of optical-signal processing apparatuses each having a construction similar to the optical-signal processing apparatus of FIG. 6 are arranged in an optical network, and data signals are transmitted from each of the plurality of optical-signal processing apparatuses through the optical network. FIG. 7 partially illustrates the optical network system according to the sixth embodiment. In the optical network system illustrated in FIG. 7, a plurality of nonlinear optical mediums 43-1, . . . , 43-(j−1), 43-j, 43-(j+1), . . . , 43-m and a plurality of optical-signal processing apparatuses 42-1, . . . , 42-(j−1), 42-j, 42-(j+1), . . . , 42-m are arranged in the optical network. In the following explanations, the optical-signal processing apparatuses 42-1, . . . , 42-(j−1), 42-j, 42-(j+1), . . . , 42-m may be referred to as the first, . . . , (j−1)-th, j-th, (j+1)-th, . . . , m-th optical-signal processing apparatuses. Each of the optical-signal processing apparatuses 42-1, . . . , 42-(j−1), 42-j, 42-(j+1), . . . , 42-m contains a nonlinear optical medium. Each of the nonlinear optical mediums may be a nonlinear optical fiber in which a nonlinear optical effect is enhanced.

Each of the optical-signal processing apparatuses 42-1, . . . 42-(j−1), 42-j, 42-(j+1), . . . , 42-m has a construction similar to the optical-signal processing apparatus of FIG. 6. For example, the optical-signal processing apparatus 42-j comprises oscillators 51-1 to 51-n, multipliers 52-1 to 52-n, an optical modulator 53, an optical combiner 54, and an optical splitter 55. The frequencies of the subcarrier signals in each optical-signal processing apparatus arranged in the optical network are different from the frequencies of the subcarrier signals in any of the other optical-signal processing apparatuses in the optical network. For example, the frequencies $f_{11}$ to $f_{1n}$ are allocated to the subcarrier signals in the first optical-signal processing apparatus 42-1, the frequencies $f_{21}$ to $f_{2n}$ are allocated to the subcarrier signals in the second optical-signal processing apparatus 42-2, and the frequencies $f_{m1}$ to $f_{mn}$ are allocated to the subcarrier signals in the m-th optical-signal processing apparatus 42-m. Although, the number of the subcarrier signals in each optical-signal processing apparatus is identical (i.e., the number of channels is n) in the above example, generally, the number of the subcarrier signals in each optical-signal processing apparatus may be different.

Figure 8:
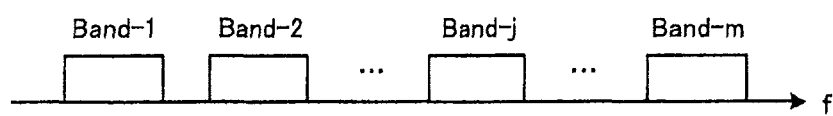
FIG. 8 indicates the distribution of the frequencies of the subcarrier-modulated data signals which are inserted from optical-signal processing apparatuses into the optical network of FIG. 7.

FIG. 8 indicates the distribution of the frequencies of the subcarrier-modulated data signals which are inserted from the optical-signal processing apparatuses 42-1 to 42-m into the optical network of FIG. 7 (and combined with the optical carrier $E_S$), where the subcarrier-modulated data signals are generated in the optical-signal processing apparatuses 42-1 to 42-m. In FIG. 8, "Band-1" indicates the extent of the frequencies of the subcarrier-modulated data signals carried by the control light which is outputted from the first optical-signal processing apparatus 42-1 and inserted into the optical network, "Band-2" indicates the range of the frequencies of the subcarrier-modulated data signals carried by the control light which is outputted from the second optical-signal processing apparatus 42-2 and inserted into the optical network, "Band-j" indicates the range of the frequencies of the subcarrier-modulated data signals carried by the control light which is outputted from the j-th optical-signal processing apparatus 42-j and inserted into the optical network, and "Band-m" indicates the range of the frequencies of the subcarrier-modulated data signals carried by the control light which is outputted from the m-th optical-signal processing apparatus 42-m and inserted into the optical network.

For example, the subcarrier-modulated data signals $B_{j1}$($f_{j1}$) to $B_{jn}$($f_{jn}$) generated in the j-th optical-signal processing apparatus 42-j have frequencies in the range Band-j, which does not overlap the range of the frequencies of the subcarrier-modulated data signals generated in any of the other optical-signal processing apparatuses as indicated in FIG. 8. This is because the frequencies of the subcarrier signals are allocated to the optical-signal processing apparatuses 42-1 to 42-m so that the range of the frequencies of the subcarrier-modulated data signals generated in each of the optical-signal processing apparatuses does not overlap the range of the frequencies of the subcarrier-modulated data signals generated in any of the other optical-signal processing apparatuses. Although the frequencies of the subcarrier-modulated data signals allocated to the optical-signal processing apparatuses 42-1 to 42-m increase in order of the locations of the optical-signal processing apparatuses in the above example, generally the allocation of the frequencies is arbitrary.

As explained above, in the optical network system according to the sixth embodiment, the plurality of nonlinear optical mediums 43-1, . . . , 43-(j−1), 43-j, 43-(j+1), . . . , 43-m and the plurality of optical-signal processing apparatuses 42-1 to 42-m are arranged in the optical network, and each optical-signal processing apparatus generates control light based on subcarrier-modulated data signals which are modulated with subcarrier signals having different frequencies, in order to realize cross phase modulation of the optical carrier with the control light. Therefore, in the optical network system according to the sixth embodiment, information corresponding to subcarrier-modulated data signals generated in more than one optical-signal processing apparatus can be multiplexed on the optical carrier in succession, where the subcarrier-modulated data signals are each generated by modulation with a subcarrier signal and each have the frequency around the frequency of the subcarrier signal. Thus, the optical network system according to the sixth embodiment facilitates transmission, from more than one arbitrary position, of a plurality of data signals.

7. Seventh Embodiment

Figure 9:
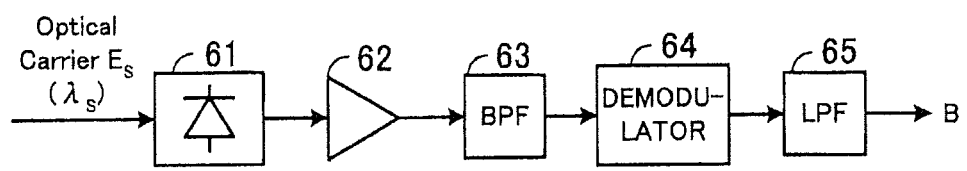
FIG. 9 illustrates a receiver according to a seventh embodiment.

A receiver according to the seventh embodiment is explained below. FIG. 9 illustrates the receiver according to the seventh embodiment. The receiver of FIG. 9 comprises a photo diode (PD) 61, an amplifier 62, a band-pass filter (BPF) 63, demodulator 64, and a low-pass filter (LPF) 65.

The PD 61 is a light receiving device which receives the (modulated) optical carrier $E_S$, and converts the optical carrier $E_S$ into an electric signal, so that, for example, an electric signal representing n-channel subcarrier-modulated data signals are outputted from the PD 61. The amplifier 62 amplifies the electric signal outputted from the PD 61. The BPF passes one or more portions, in one or more frequency ranges respectively centered at the frequencies of one or more carrier signals, of the electric signal amplified by the amplifier 62. For example, in the case where the amplifier 62 outputs an electric signal including n-channel subcarrier-modulated data signals, the BPF 63 passes electric signals in the ranges respectively centered at the frequencies of the n corresponding subcarrier signals. That is, in this case, the portions, corresponding to the respective channels, of the electric signal outputted from the amplifier 62 are separated. Alternatively, the BPF 63 may pass portions of the electric signal corresponding to necessary channels only, instead of passing the portions of the electric signal corresponding to all the n channels.

The demodulator 64 is a circuit which demodulates the one or more portions of the electric signal, for example, according to the manner of modulation of one or more data signals. The demodulator 64 is, for example, an envelope detector, a square-law detector, a phase detector, a frequency discriminator, or the like. The LPF 65 passes a low-frequency portion of each of the output channels of the demodulator 64.

As explained above, the receiver according to the seventh embodiment can demodulate one or more data signals transmitted by cross phase modulation in a nonlinear optical medium with control light, which is generated by modulation of one or more carrier signals with the one or more data signals.

Alternatively, it is possible to combine local light with the optical carrier $E_S$ before inputting the optical carrier $E_S$ into the PD 61, where the frequency (wavelength) of the local light is differentiated from the frequency (wavelength) of the optical carrier by a desired detuning frequency ($f_{if}$). In this case, the PD 61 can output an electric signal in an intermediate frequency range. Such a receiver will be explained later with reference to FIG. 28.

Further alternatively, it is possible to arrange, in the stage following the demodulator, a digital-signal-processing circuit for detection of errors, cancellation of fluctuations, and the like in the demodulated data signals.

8. Eighth Embodiment

Figure 10:
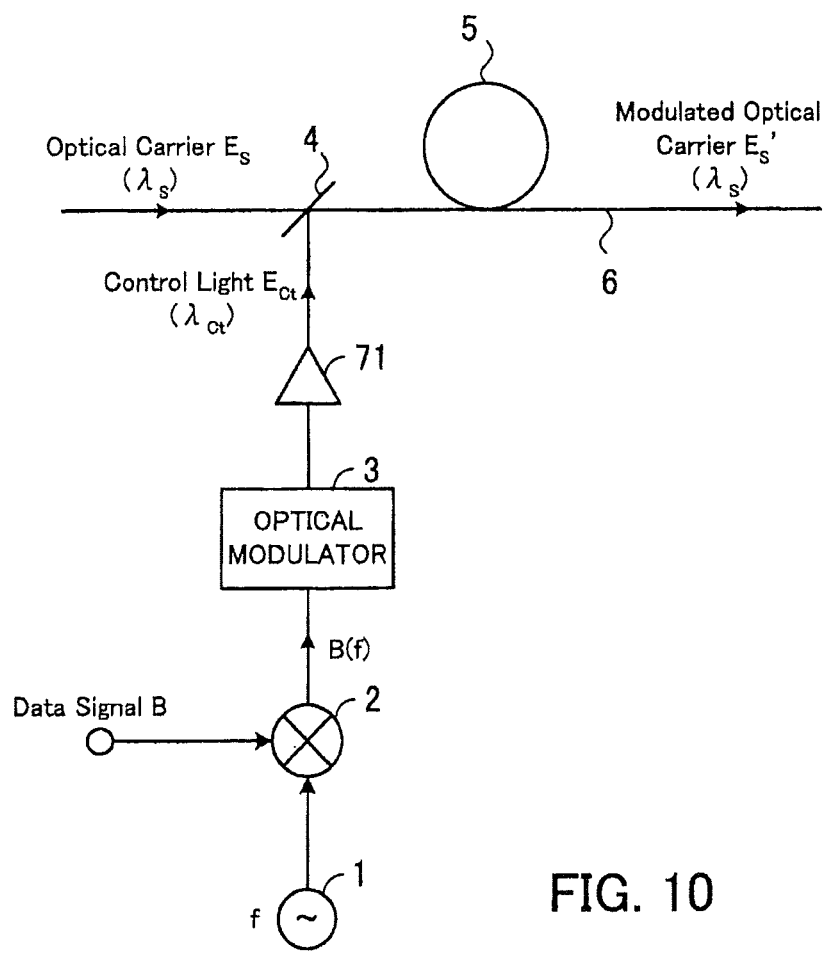
FIG. 10 illustrates an optical-signal processing apparatus according to an eighth embodiment.

An optical-signal processing apparatus according to the eighth embodiment is explained below. FIG. 10 illustrates the optical-signal processing apparatus according to the eighth embodiment. The optical-signal processing apparatus according to the eighth embodiment is different from the first embodiment in that the control light is optically amplified. In the optical-signal processing apparatus of FIG. 10, an optical amplifier 71 is arranged between the optical modulator 3 and the optical combiner 4. The optical amplifier 71 amplifies the control light $E_{Ct}$ (outputted from the optical modulator 3), and outputs the amplified control light $E_{Ct}$ to the optical combiner 4. The optical amplifier 71 is, for example, an optical fiber amplifier, a semiconductor optical amplifier, an optical parametric amplifier, or the like. Since the control light $E_{Ct}$ is amplified before being inputted into the nonlinear optical medium 5, the data signal B can be appropriately obtained by demodulation in a receiver.

As explained above, in a similar manner to FIG. 10, it is also possible to arrange an optical amplifier on the output side of the optical modulator in the optical-signal processing apparatuses of FIGS. 2 and 3.

Alternatively, the optical carrier $E_S$ (propagating through the optical transmission line 6) may be amplified. For example, an optical amplifier may be arranged on the input side of the optical combiner 4 in the optical transmission line 6 illustrated in FIG. 10 so as to amplify the optical carrier $E_S$. Even in this case, the data signal B can also be appropriately demodulated in a receiver.

9. Ninth Embodiment

Figure 11:
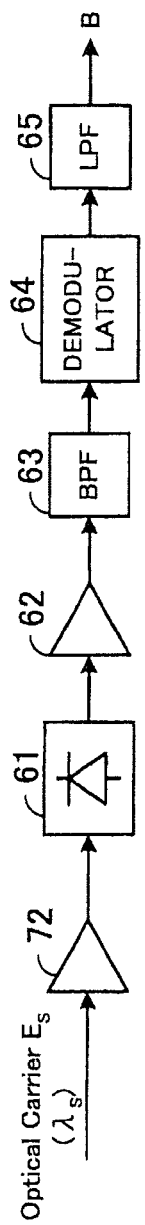
FIG. 11 illustrates a receiver according to a ninth embodiment.

A receiver according to the ninth embodiment is explained below. FIG. 11 illustrates the receiver according to the ninth embodiment, in which the optical carrier $E_S$ is amplified before being inputted into the PD 61. That is, in the receiver according to the ninth embodiment, an optical amplifier 72 is arranged on the input side of the PD 61. Thus, the optical amplifier 72 amplifies the optical carrier $E_S$ (which is transmitted through the optical transmission line 6 and a nonlinear optical medium) before the optical carrier $E_S$ is inputted into the PD 61. The optical amplifier 72 is, for example, an optical fiber amplifier, a semiconductor optical amplifier, an optical parametric amplifier, or the like.

Since the optical carrier $E_S$ is amplified before being inputted into the PD 61 as explained above, it is possible to appropriately obtain the data signal B from the demodulator.

10. Tenth Embodiment

Figure 12:
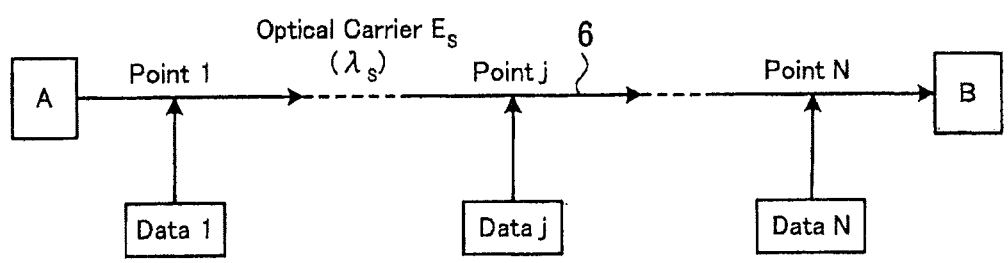
FIG. 12 illustrates a first example of an optical network system according to a tenth embodiment containing optical-signal processing apparatuses.

Examples of an optical network system according to the tenth embodiment are explained below. FIG. 12 illustrates a first example of the optical network system according to the tenth embodiment containing optical-signal processing apparatuses. In the optical network system of FIG. 12, an optical-signal processing apparatus (which may or may not belong to an optical network system) is connected, at each of the points 1, . . . , j, . . . , N, to an optical transmission line 6 connecting a point A and a point B.

It is assumed that the optical carrier $E_S$ having the wavelength $\lambda_S$ propagates from the point A to the point B through the optical transmission line 6. The optical-signal processing apparatus connected to each of the points 1, . . . , j, . . . , N inserts control light conveying modulated data signals, into the optical transmission line 6 through the point so as to multiplex the modulated data signals with the optical carrier $E_S$. The information represented by the modulated data signals 1, . . . , N respectively inserted from the points 1, . . . , N is, for example, information on sensors and/or monitors in the optical network, information on electric power in the optical network, information on users' requests in a local area network, and other information. For example, the example of FIG. 12 can be applied to optical wirings interconnecting servers in a data center.

Figure 13:
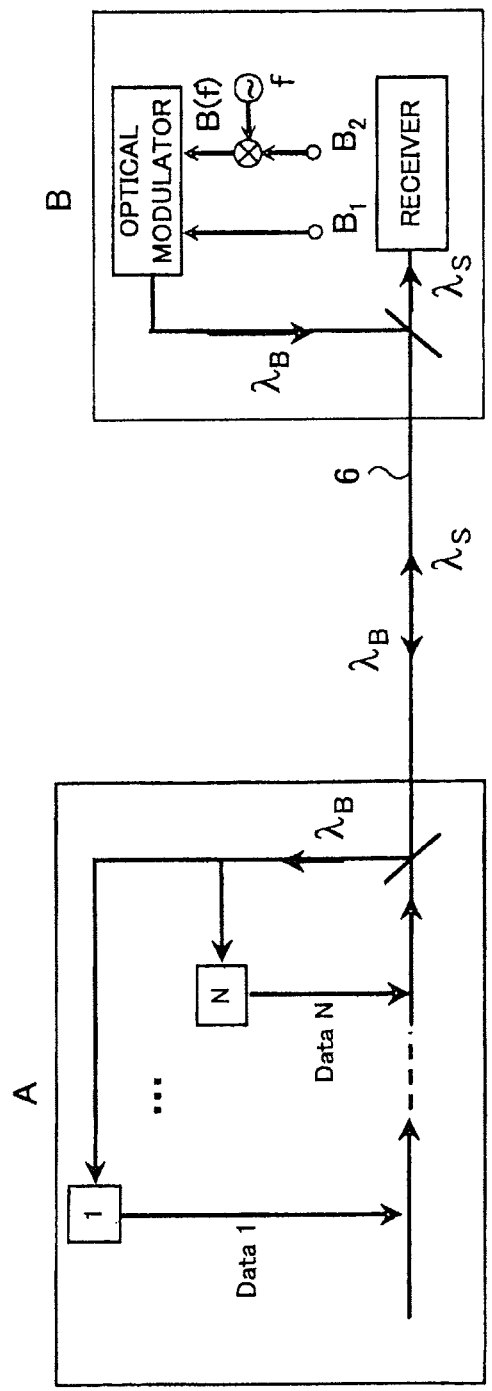
FIG. 13 illustrates an example of a bidirectional optical transmission system to which the optical network system of FIG. 12 is applied.

FIG. 13 illustrates an example of a bidirectional optical transmission system to which the optical network system of FIG. 12 is applied. In the terminal B at the point B, a carrier signal having the frequency f is modulated with information $B_2$ so as to generate an RF signal, and a combined signal is generated by combining baseband information $B_1$ with the RF signal, and is then inputted into an optical modulator. Thus, the optical modulator outputs modulated light (having the wavelength $\lambda_B$) into the optical transmission line 6, so that the modulated light is transmitted to the point A. Then, the terminal A at the point A splits the modulated light from the optical carrier $E_S$, and receives the RF signal (modulated with the carrier signal having the frequency f) or the baseband signal. On the other hand, the optical carrier $E_S$ having the wavelength $\lambda_S$ propagates from the terminal A to the terminal B, and the modulated data signals 1, . . . , N are multiplexed on the optical carrier $E_S$ by inserting control light into the optical transmission line 6 from each of the optical-signal processing apparatuses at the points 1, . . . , j, . . . , N. When the modulated data signals 1, . . . , N multiplexed on the optical carrier $E_S$ propagate through the optical transmission line 6 and reach the terminal B, the terminal B can split and receive the modulated data signals 1, . . . , N from the optical carrier $E_S$.

The baseband information $B_1$ is, for example, a baseband signal and the like being transmitted in the conventional passive optical network (PON) or the like and having the transmission rate of 100 Mb/s, 1 Gb/s, 10 Gb/s, or the like. In this case, the information $B_2$ may be an information signal having the bandwidth (bit rate) identical to or different from the baseband information $B_1$. In the case where both of the baseband information $E_1$ and the information $B_2$ are digital signals, the degrees of modulation, the bit rates, the power, and the like of the baseband information $B_1$ and the information $B_2$ are adjusted so that the baseband information $B_1$ and the information $B_2$ can be received by the terminal A with similar reception sensitivities.

Figure 14:
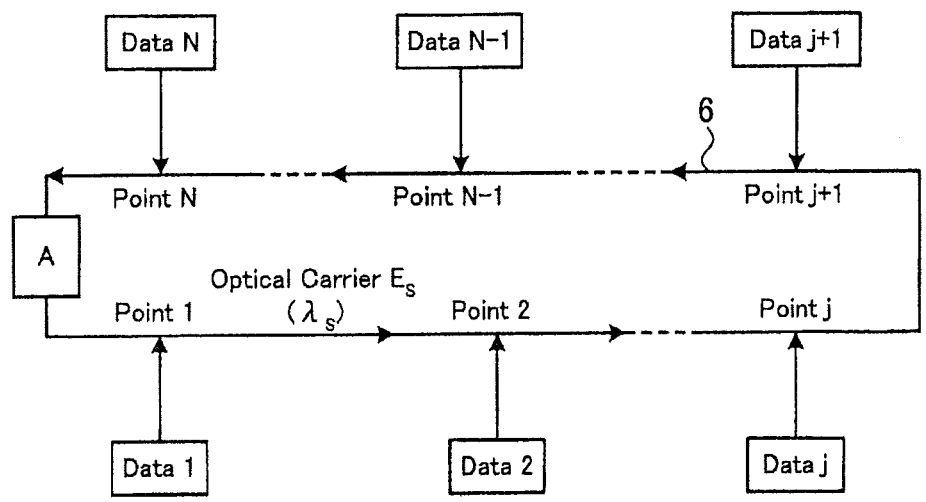
FIG. 14 illustrates a second example of an optical network system according to the tenth embodiment containing optical-signal processing apparatuses.

FIG. 14 illustrates a second example of an optical network system according to the tenth embodiment containing optical-signal processing apparatuses. In the second example of the optical network system illustrated in FIG. 14, the optical carrier $E_S$ having the wavelength $\lambda_S$ propagates in the anticlockwise direction through an optical transmission line 6 which forms a loop passing through the point A, and an optical-signal processing apparatus or an optical network system is connected to the optical transmission line 6 at each of arbitrary points 1, . . . , j, . . . , N. Modulated data signals 1, . . . , N, which are similar to the first example of FIG. 12, are multiplexed on the optical carrier $E_S$ by inserting control light from the arbitrary points into the optical transmission line 6.

As explained above, the optical-signal processing apparatus or optical network system connected to the optical transmission line 6 can easily transmit information from arbitrary points. In addition, the optical network system according to the sixth embodiment needs neither more than one optical fiber nor more than one optical carrier having more than one wavelength even in the case where data signals from more than one source are transmitted, since data signals can be easily transmitted by modulating the data signals and multiplexing the modulated data signals on a single optical carrier $E_S$ propagating through an optical network. However, it is possible to arrange a plurality of optical carriers to propagate through an optical network, and multiplex the data signals on the plurality of optical carriers.

Further, the data signals which are multiplexed on the optical carrier $E_S$ by other optical-signal processing apparatuses in the optical network systems illustrated in FIGS. 12 and 14 can be extracted and observed at an arbitrary point, for example, by a technique in which a portion of the optical carrier $E_S$ is extracted by tapping by use of a power branch circuit, or a technique in which continuous-wave (CW) light having a wavelength near the control light is combined with the optical carrier $E_S$ and idler light generated by four-wave mixing occurring in the optical fiber is extracted by an optical filter or a WDM coupler.

11. Eleventh Embodiment

Figure 15:
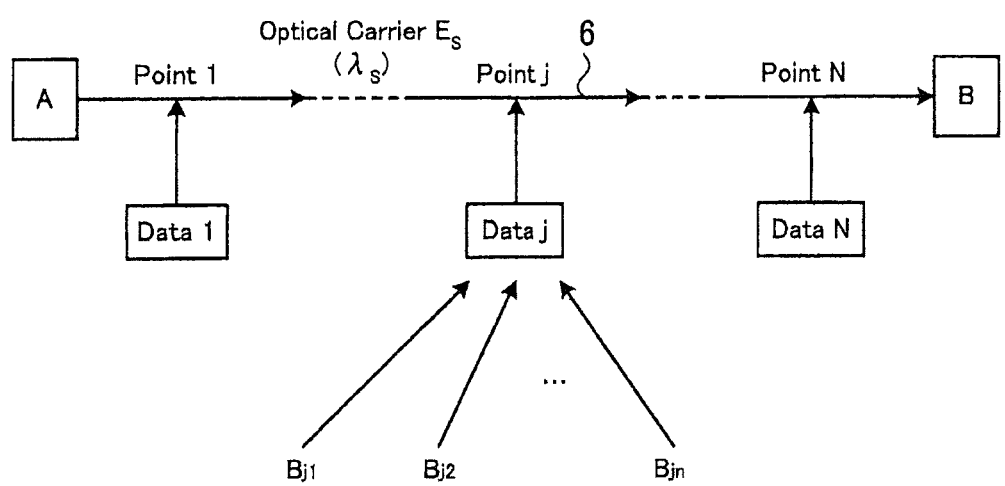
FIG. 15 illustrates a first example of collection of information in an optical network system containing optical-signal processing apparatuses according to an eleventh embodiment.

Examples of an optical network system according to the eleventh embodiment are explained below. FIG. 15 illustrates a first example of the optical network system according to the eleventh embodiment containing optical-signal processing apparatuses. In the optical network system of FIG. 15, an optical-signal processing apparatus (which may or may not belong to an optical network system) is connected, at each of the points 1, . . . , j, . . . , N, to an optical transmission line 6 connecting a point A and a point B.

In the optical network system of FIG. 15, data signals $B_{j1}$ to $B_{jn}$ which are to be transmitted by multiplexing with the optical carrier $E_S$ are collected by each optical-signal processing apparatus j arranged at the point j (j=1 to N). The collection may be made by wired or wireless communication. Each optical-signal processing apparatus j inserts control light (optically modulated on the basis of modulated data signals) into the optical transmission line 6 so as to multiplex the modulated data signals on the optical carrier $E_S$, for example, as explained with reference to FIG. 6.

Figure 16:
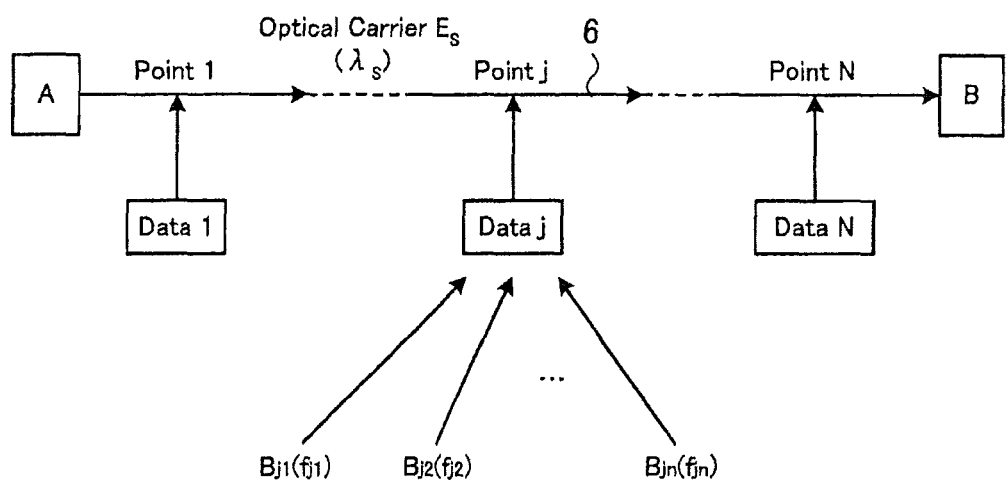
FIG. 16 illustrates a second example of collection of information in the optical network system according to the eleventh embodiment containing the optical-signal processing apparatuses.

FIG. 16 illustrates a second example of an optical network system according to the eleventh embodiment containing optical-signal processing apparatuses. In the example of the optical network system illustrated in FIG. 16, an optical-signal processing apparatus or an optical network system is connected to the optical transmission line 6 at each of arbitrary points 1, . . . , j, . . . , N.

As illustrated in FIG. 16, subcarrier modulated data signals $B_{j1}(f_{j1})$ to $B_{jn}(f_{jn})$ (instead of the used data signals $B_{j1}$ to $B_{jn}$) which are to be transmitted by multiplexing with the optical carrier $E_S$ are collected by each optical-signal processing apparatus j arranged at the point j (j=1 to N). The subcarrier modulated data signals $B_{j1}(f_{j1})$ to $B_{jn}(f_{jn})$ are signals generated by modulating data signals $B_{j1}$ to $B_{jn}$ on the carrier signals having the frequencies $f_{j1}$ to $f_{jn}$, respectively. The collection may be made by wired or wireless communication. Then, each optical-signal processing apparatus j can insert the control light (optically modulated on the basis of the subcarrier modulated data signals) into the optical transmission line 6 so as to multiplex the modulated data signals on the optical carrier $E_S$.

In the example of FIG. 16, the data signals are modulated in the sources (not shown) of the data signals. Therefore, the optical-signal processing apparatus or optical network system at each of arbitrary points 1, . . . , N needs neither the oscillator nor the multiplier. Each optical-signal processing apparatus is required only to generate and output the control light based on the subcarrier modulated data signals by use of the optical modulator.

12. Twelfth Embodiment

An optical network system according to the twelfth embodiment is explained below. In the twelfth embodiment, a number of data signals are frequency-division multiplexed within a narrow bandwidth.

Figure 17A:
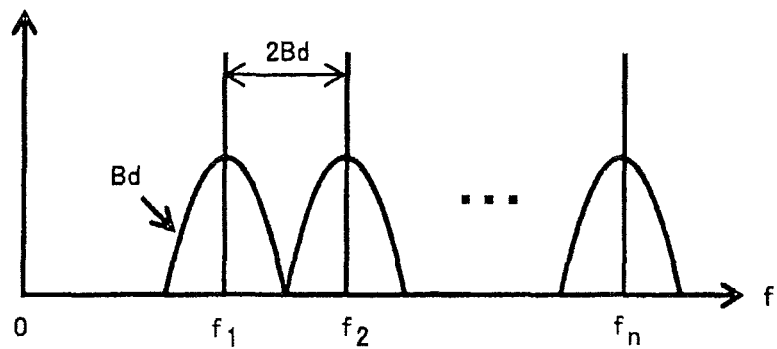
FIGS. 17A and 17B indicate the distributions of the subcarrier frequencies for explaining operations of an optical-signal processing apparatus according to a twelfth embodiment.
Figure 17B:
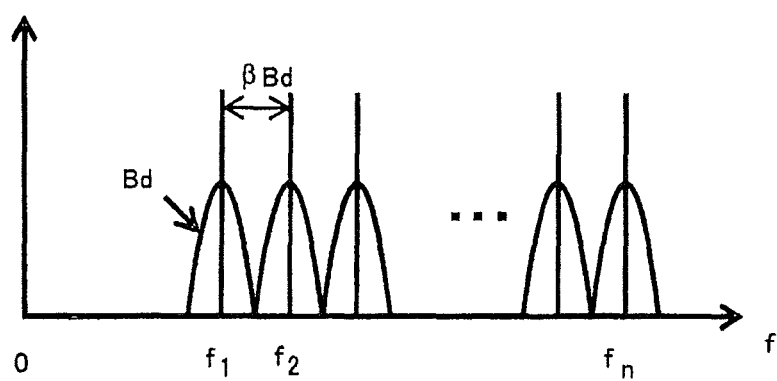

FIGS. 17A and 17B indicate the allocations of the subcarrier frequencies for explaining operations of the optical-signal processing apparatus according to the twelfth embodiment. FIG. 17A indicates the allocation of the subcarrier frequencies in a common frequency-division multiplexing system, and FIG. 17B indicates the allocation of the subcarrier frequencies in a frequency-division multiplexing system used in the twelfth embodiment.

In the case where data signals each having a bandwidth Bd are frequency-division multiplexed in the common frequency-division multiplexing system, as indicated in FIG. 17A, the carrier spacing is set to 2 Bd or greater in order to prevent crosstalk from adjacent channels. When the carrier spacing is set to 2 Bd or greater, the main lobe of the bandwidth of each of the modulated data signals can be separated from the main lobe of the bandwidth of one or two adjacent modulated data signals as indicated in FIG. 17A, so that satisfactory data transmission is enabled.

On the other hand, in the frequency-division multiplexing used in the twelfth embodiment, the carrier spacing is set to $\beta Bd$ ($\beta<2$), and the bandwidth of each modulated data signal is limited by using a filter so that crosstalk does not occur even in the case where the carrier spacing is $\beta Bd$ ($\beta<2$).

For example, the bandwidths of the modulated data signals in the optical-signal processing apparatus illustrated in FIG. 6 can be limited by arranging low-pass filters (LPFs) which respectively limit the bandwidths of the data signals $B_1$ to $B_n$ before the data signals $B_1$ to $B_n$ are inputted into the multipliers 32-1 to 32-n so as to limit the bandwidths of the data signals $B_1$ to B. In this case, the subcarrier-modulated data signals $B_1(f_1)$ to $B_n(f_n)$ inputted into the optical modulator 33 have the allocation of frequencies as indicated in FIG. 17B. Alternatively, it is possible to arrange band-pass filters (BPFs) which respectively limit the bandwidths of the subcarrier-modulated data signals $B_1(f_1)$ to $B_n(f_n)$ before the subcarrier-modulated data signals $B_1(f_1)$ to $B_n(f_n)$ are inputted into the optical modulator 33. In this case, the subcarrier-modulated data signals $B_1(f_1)$ to $B_n(f_n)$ inputted into the optical modulator 33 can also have the distribution of frequencies as indicated in FIG. 17B. Further alternatively, it is possible to arrange an optical band-pass filter on the output side of the optical modulator 33 so as to limit the bandwidths of the components corresponding to the subcarrier-modulated data signals $B_1(f_1)$ to $B_n(f_n)$ in the control light $E_{Ct}$ as indicated in FIG. 17B.

Further, the bandwidths of the modulated data signals can be reduced by use of the multi-level modulation or other types of optical multiplex transmission systems.

Furthermore, in order to compensate for quality degradation caused by the bandwidth limitation, when necessary, it is possible to use forward error correction codes, or provide a means for the compensation which is realized by, for example, a digital signal processor.

As explained above, the bandwidth limitation of the data signals by using band-pass filters or low-pass filters enables frequency-division multiplexing of a number of data signals within a narrow bandwidth. The above provision for the bandwidth limitation using band-pass filters or low-pass filters can be similarly applied to the optical network system illustrated in FIG. 7.

13. Thirteenth Embodiment

Figure 18:
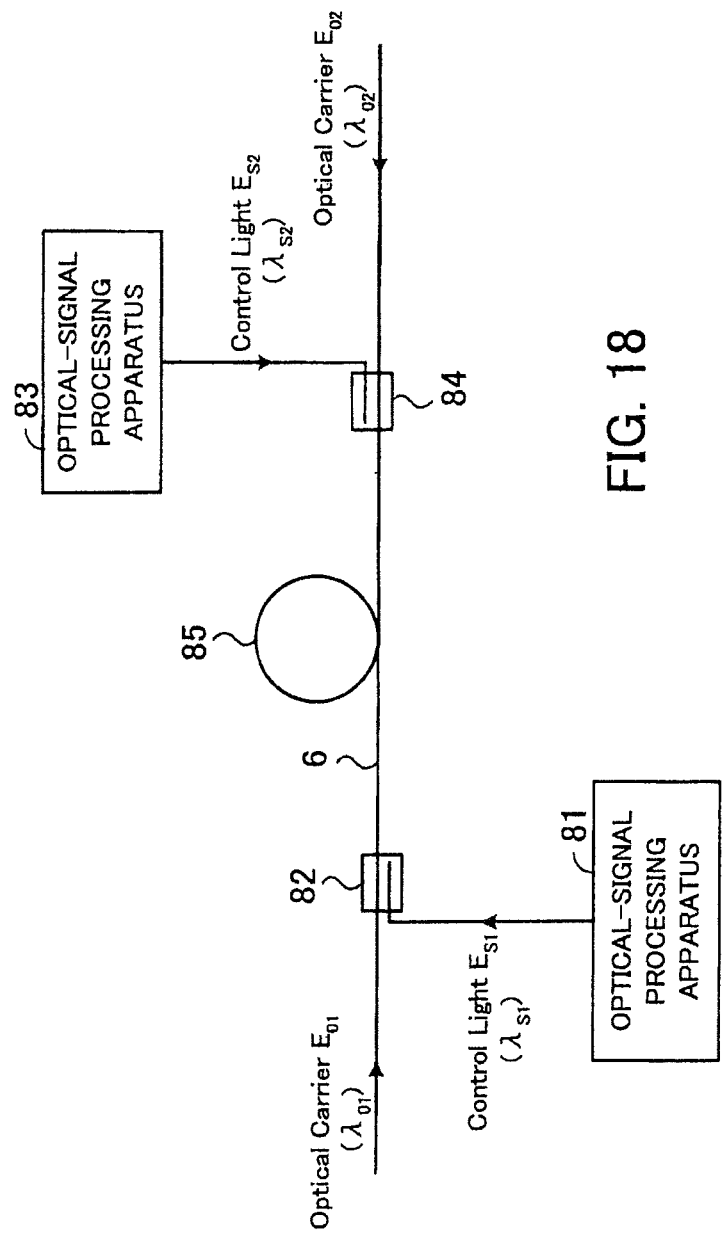
FIG. 18 illustrates an optical network system according to a thirteenth embodiment.

An optical network system according to the thirteenth embodiment is explained below. In the thirteenth embodiment, bidirectional transmission of modulated data signals is performed through an optical transmission line in a multiplexed manner. FIG. 18 illustrates the optical network system according to the thirteenth embodiment. In FIG. 18, optical couplers 82 and 84 and a nonlinear optical medium 85 are arranged in an optical transmission line 6. In addition, optical-signal processing apparatuses 81 and 83 are respectively connected to the optical couplers 82 and 84.

An optical carrier $E_{O1}$ having the wavelength $\lambda_{O1}$ and an optical carrier $E_{O2}$ having the wavelength $\lambda_{O2}$ propagate through the optical transmission line 6 and the nonlinear optical medium 85, where the direction of the propagation of the optical carrier $E_{O1}$ is opposite to the direction of the propagation of the optical carrier $E_{O2}$. In FIG. 18, the optical carrier $E_{O1}$ propagates from the left to the right, and the optical carrier $E_{O2}$ propagates from the right to the left. The optical transmission line 6 is realized by, for example, an optical fiber. The nonlinear optical medium 85 is, for example, a portion of the optical fiber realizing the optical transmission line 6. Alternatively, the nonlinear optical medium 85 may be a nonlinear optical fiber in which a nonlinear optical effect is enhanced.

The optical-signal processing apparatus 81 is, for example, the optical-signal processing apparatus of FIG. 1. The optical modulator in the optical-signal processing apparatus 81 outputs control light $E_{S1}$ having the wavelength $\lambda_{S1}$. The control light $E_{S1}$ is generated by optical modulation based on a modulated data signal, which is generated by modulation of a carrier signal with a data signal. The optical coupler 82 optically combines the control light $E_{S1}$ with the optical carrier $E_{O1}$ propagating through the optical transmission line 6 before propagating through the nonlinear optical medium 85. The optical coupler 82 is, for example, a WDM coupler. Therefore, the optical carrier $E_{O1}$ undergoes cross phase modulation (XPM) with the control light $E_{S1}$ in the nonlinear optical medium 85, so that the modulated data signal is multiplexed on the optical carrier $E_{O1}$.

The optical-signal processing apparatus 83 is, for example, the optical-signal processing apparatus of FIG. 1. The optical modulator in the optical-signal processing apparatus 83 outputs control light $E_{S2}$ having the wavelength $\lambda_{S2}$. The control light $E_{S2}$ is generated by optical modulation based on a modulated data signal, which is generated by modulation of a carrier signal with a data signal. The optical coupler 84 optically combines the control light $E_{S2}$ with the optical carrier $E_{O2}$ propagating through the optical transmission line 6 before propagating through the nonlinear optical medium 85. The optical coupler 84 is, for example, a WDM coupler. Therefore, the optical carrier $E_{O2}$ undergoes cross phase modulation (XPM) with the control light $E_{S2}$ in the nonlinear optical medium 85, so that the modulated data signal is multiplexed on the optical carrier $E_{O2}$.

Figure 19:
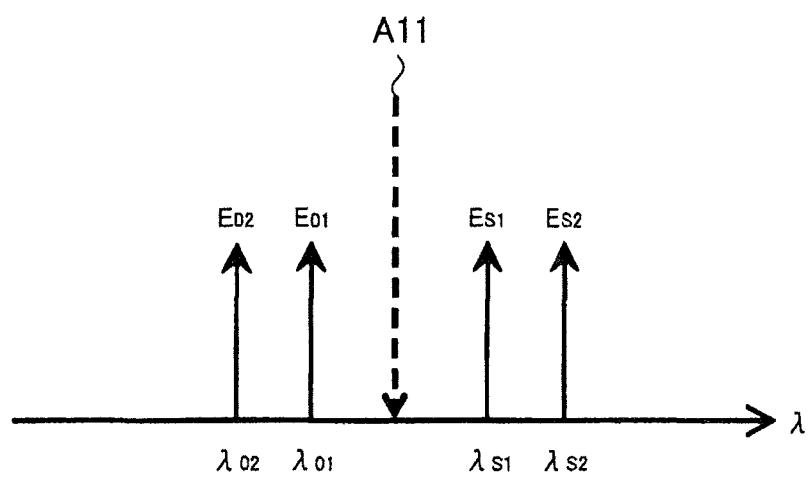
FIG. 19 indicates the wavelengths of optical carriers and control light with respect to the cut-off wavelength of optical couplers in the optical network system of FIG. 18.

FIG. 19 indicates an example allocation of the wavelengths $\lambda_{O1}$ and $\lambda_{O2}$ of the optical carriers $E_{O1}$ and $E_{O2}$ and the wavelengths $\lambda_{S1}$ and $\lambda_{S2}$ of the control light $E_{S1}$ and $E_{S2}$ with respect to the cut-off wavelength of the optical couplers 82 and 84 in the optical network system of FIG. 18. In FIG. 18, the abscissa corresponds to the wavelength, and the cut-off wavelength of the optical couplers 82 and 84 is indicated by the downwards dashed arrow A11. The optical coupler 82 has input ports for the optical carrier $E_{O1}$ and the control light $E_{S1}$, and the optical coupler 84 has input ports for the optical carrier $E_{O2}$ and the control light $E_{S2}$. The optical couplers 82 and pass the optical carriers having the wavelengths smaller than the cut-off wavelength when the optical carriers are inputted from the input ports for the optical carriers $E_{O1}$ and $E_{O2}$, and cut (split) off the control light having wavelengths greater than the cut-off wavelength when the control light is inputted from the input ports for the optical carriers $E_{O1}$ and $E_{O2}$. In addition, the optical couplers 82 and 84 pass the control light having the wavelengths greater than the cut-off wavelength when the control light is inputted from the input ports for the control light $E_{S1}$ and $E_{S2}$, and cut (split) off the optical carriers having the wavelengths smaller than the cut-off wavelength when the optical carriers are inputted from the input ports for the control light $E_{S1}$ and $E_{S2}$.

In order to realize the above operations of the optical couplers 82 and 84, the wavelengths $\lambda_{O1}$ and $\lambda_{O2}$ of the optical carriers $E_{O1}$ and $E_{O2}$ are allocated within the transmission bandwidths of the input ports for the optical carriers $E_{O1}$ and $E_{O2}$ in the optical couplers 82 and 84, respectively, and the wavelengths $\lambda_{S1}$ and $\lambda_{S2}$ of the control light $E_{S1}$ and $E_{S2}$ are allocated outside the transmission bandwidths of the input ports for the optical carriers $E_{O1}$ and $E_{O2}$ in the optical couplers 82 and 84, respectively. Thus, when the wavelengths $\lambda_{O1}$ and $\lambda_{O2}$ of the optical carriers $E_{O1}$ and $E_{O2}$, the wavelengths $\lambda_{S1}$ and $\lambda_{S2}$ of the control light $E_{S1}$ and $E_{S2}$, and the cut-off wavelength in the optical couplers 82 and 84 are set as explained above (as indicated in FIG. 19), the optical carriers $E_{O1}$ and $E_{O2}$ and the control light $E_{S1}$ and $E_{S2}$ can be efficiently inputted into the nonlinear optical medium 85, so that the optical carriers $E_{O1}$ and $E_{O2}$ can respectively undergo cross phase modulation with the control light $E_{S1}$ and $E_{S2}$ with almost no loss. Thereafter, the control light $E_{S1}$ and $E_{S2}$ used for the cross phase modulation are respectively cut off by the optical couplers 84 and 82 so that the control light $E_{S1}$ and $E_{S2}$ do not propagate through the optical transmission line 6 beyond the optical couplers 84 and 82. The above functions of each of the WDN couplers can be realized by a combination of an optical power combiner and an optical band-pass filter. However, in this case, the optical power combiner causes power loss, so that the power is greatly lost compared with the case in which WDM coupler is used.

As explained above, in the optical network system according to the thirteenth embodiment, the optical carrier $E_{O1}$ propagating through the nonlinear optical medium 85 in one direction undergoes cross phase modulation with the control light $E_{S1}$ which is generated by optical modulation with a subcarrier-modulated data signal, which is generated by modulating a carrier signal with a data signal, and the optical carrier $E_{O2}$ propagating through the nonlinear optical medium 85 in the opposite direction undergoes cross phase modulation with the control light $E_{S2}$ which is also generated by optical modulation with a subcarrier-modulated data signal, which is generated by modulating a carrier signal with a data signal. Thus, information can be transmitted from an arbitrary position in the bidirectional optical network.

Although each of the optical-signal processing apparatuses 81 and 83 in FIG. 18 is assumed to be the optical-signal processing apparatus of FIG. 1 in the above explanations, the optical-signal processing apparatuses 81 and 83 may be any of the optical-signal processing apparatuses illustrated in FIGS. 2, 3, and 10. Alternatively, a light beat which is obtained as a frequency-difference component when two light waves having different wavelengths (frequencies) are optically combined may be used as the control light. In this case, optical phase modulation can be performed by using the above frequency-difference component as a subcarrier signal, and frequency-division multiplexing of signals with higher data rates can be performed by using wide-band cross phase modulation at higher frequencies. In addition, frequency-division multiplexing of signals in a greater number of channels can be performed by using wide-band cross phase modulation.

14. Fourteenth Embodiment

Figure 20:
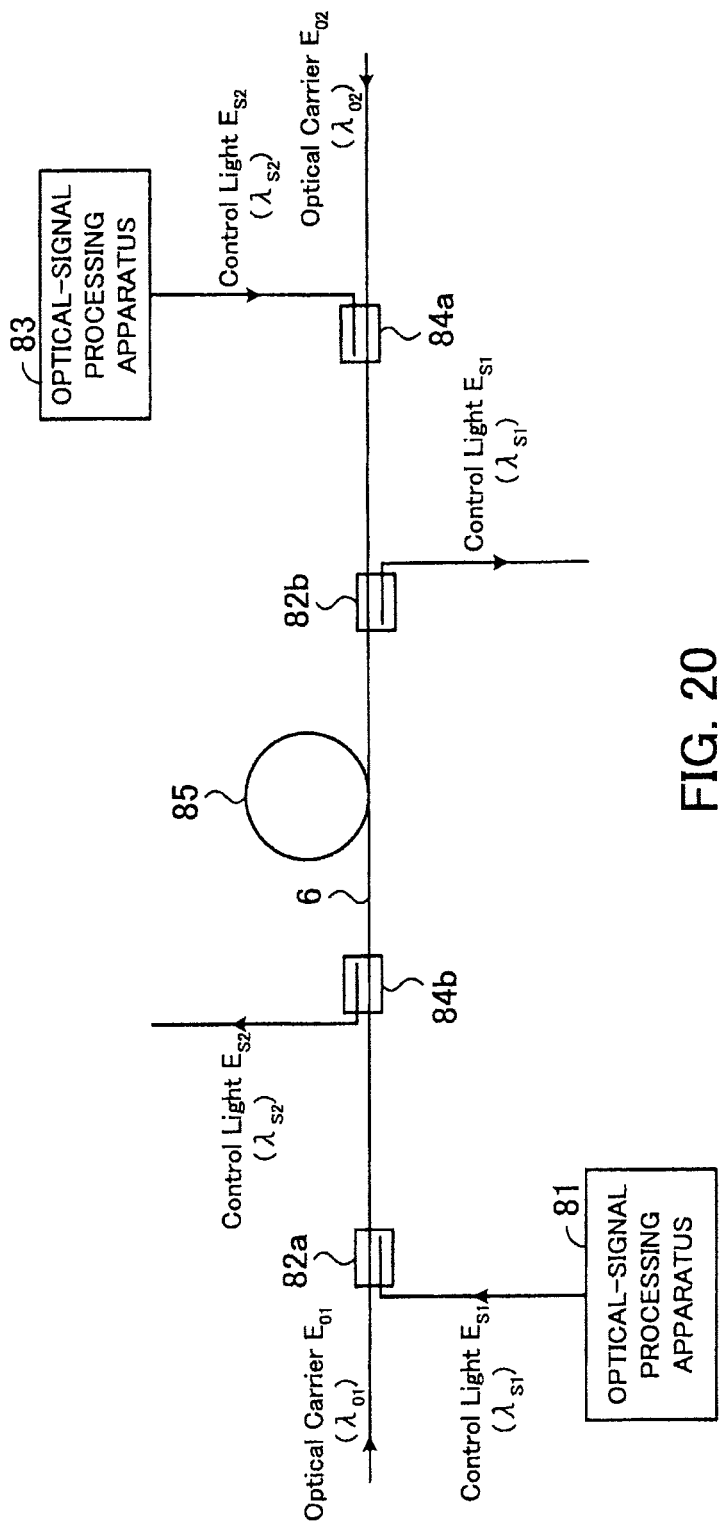
FIG. 20 illustrates an optical network system according to a fourteenth embodiment.

An optical network system according to the fourteenth embodiment is explained below. The optical network system according to the fourteenth embodiment is different from the optical network system according to the thirteenth embodiment in that optical couplers which split off the control light from the optical carriers are arranged in the optical transmission line 6 in addition to the arrangement in the optical network system according to the thirteenth embodiment. FIG. 20 illustrates the optical network system according to the fourteenth embodiment. In FIG. 20, optical couplers 82a, 82b, 84a, and 84b and the nonlinear optical medium 85 are arranged in the optical transmission line 6. In addition, optical-signal processing apparatuses 81 and 83 are respectively connected to the optical couplers 82a and 84a.

The optical coupler 82a optically combines the control light $E_{S1}$ (which is outputted from the optical-signal processing apparatus 81) with the optical carrier $E_{O1}$ propagating through the optical transmission line 6 (connected to the nonlinear optical medium 85). The optical coupler 82a is, for example, a WDM coupler.

The optical coupler 82b splits the control light $E_{S1}$ from the optical carrier $E_{01}$ propagating through the optical transmission line 6. The optical coupler 82b prevents propagation of the control light $E_{S1}$ to the stage beyond the nonlinear optical medium 85. The optical coupler 82b is, for example, a WDM coupler.

The optical coupler 84a optically combines the control light $E_{S2}$ (which is outputted from the optical-signal processing apparatus 83) with the optical carrier $E_{02}$ propagating through the optical transmission line 6 (connected to the nonlinear optical medium 85). The optical coupler 84a is, for example, a WDM coupler.

The optical coupler 84b splits the control light $E_{S2}$ from the optical carrier $E_{02}$ propagating through the optical transmission line 6 (connected to the nonlinear optical medium 85). The optical coupler 84b prevents propagation of the control light $E_{S2}$ to the stage beyond the nonlinear optical medium 85. The optical coupler 84b is, for example, a WDM coupler.

Figure 21:
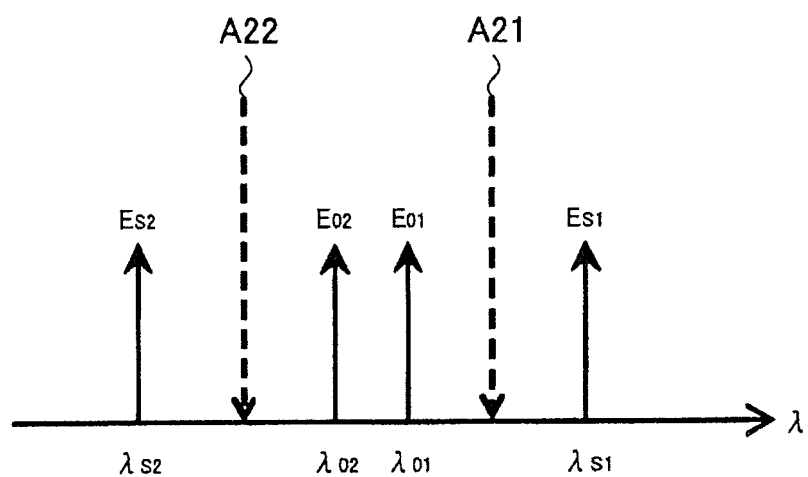
FIG. 21 indicates the wavelengths of optical carriers and control light with respect to the cut-off wavelengths of optical couplers in the optical network system of FIG. 20.

FIG. 21 indicates an example allocation of the wavelengths $\lambda_{01}$ and $\lambda_{02}$ of the optical carriers $E_{01}$ and $E_{02}$ and the wavelengths $\lambda_{S1}$ and $\lambda_{S2}$ of the control light $E_{S1}$ and $E_{S2}$ with respect to the cut-off wavelength of the optical couplers 82a and 82b and the cut-off wavelength of the optical couplers 84a and 84b. In FIG. 21, the abscissa corresponds to the wavelength, the cut-off wavelength of the optical couplers 82a and 82b is indicated by the downwards dashed arrow A21, and the cut-off wavelength of the optical couplers 84a and 84b is indicated by the downwards dashed arrow A22.

The optical couplers 82a and 82b pass the control light having wavelengths smaller than the cut-off wavelength of the optical couplers 82a and 82b indicated by the downwards dashed arrow A21, and cut (split) off the control light having wavelengths equal to or greater than the cut-off wavelength of the optical couplers 82a and 82b.

The optical couplers 84a and 84b pass the control light having wavelengths greater than the cut-off wavelength of the optical couplers 84a and 84b indicated by the downwards dashed arrow A22, and cut (split) off the control light having wavelengths equal to or smaller than the cut-off wavelength of the optical couplers 84a and 84b.

As indicated in FIG. 21, the cut-off wavelength of the optical couplers 84a and 84b indicated by the downwards dashed arrow A22 is assumed to be smaller than the cut-off wavelength of the optical couplers 82a and 82b indicated by the downwards dashed arrow A21, so that the wavelengths between the cut-off wavelength indicated by the downwards dashed arrow A21 and the cut-off wavelength indicated by the downwards dashed arrow A22 constitute the transmission bandwidth for the optical carriers.

The wavelengths $\lambda_{01}$ and $\lambda_{02}$ of the optical carriers $E_{01}$ and $E_{02}$ are allocated within the above transmission bandwidth, and the wavelengths $\lambda_{S1}$ and $\lambda_{S2}$ of the control light $E_{S1}$ and the control light $E_{S2}$ are allocated at symmetric positions on both sides of the transmission bandwidth along the wavelength axis as indicated in FIG. 21.

Thus, when the wavelengths $\lambda_{01}$ and $\lambda_{02}$ of the optical carriers $E_{01}$ and $E_{02}$, the wavelengths $\lambda_{S1}$ and $\lambda_{S2}$ of the control light $E_{S2}$ and $E_{S2}$, and the cut-off wavelengths in the optical couplers 82a, 82b, 84a, and 84b are set as explained above (as indicated in FIG. 19), the optical carriers $E_{01}$ and $E_{02}$ and the control light $E_{S1}$ and $E_{S2}$ can be efficiently inputted into the nonlinear optical medium 85, so that the optical carriers $E_{01}$ and $E_{02}$ can respectively undergo cross phase modulation with the control light $E_{S2}$ and $E_{S2}$ with almost no loss. Thereafter, the control light $E_{S1}$ and the control light $E_{S2}$ used for the cross phase modulation are cut off by the optical couplers 82b and 84b so that the control light $E_{S1}$ and $E_{S2}$ do not propagate through the optical transmission line 6 beyond optical couplers 82b and 84b, respectively.

As explained above, in the optical network system according to the fourteenth embodiment, the wavelengths $\lambda_{S1}$ and $\lambda_{S2}$ of the control light $E_{S1}$ and the control light $E_{S2}$ are arranged at symmetric positions on both sides of the transmission bandwidth along the wavelength axis. Therefore, it is possible to efficiently use the transmission bandwidth and flexibly allocate the wavelengths.

15. Fifteenth Embodiment

Figure 22:
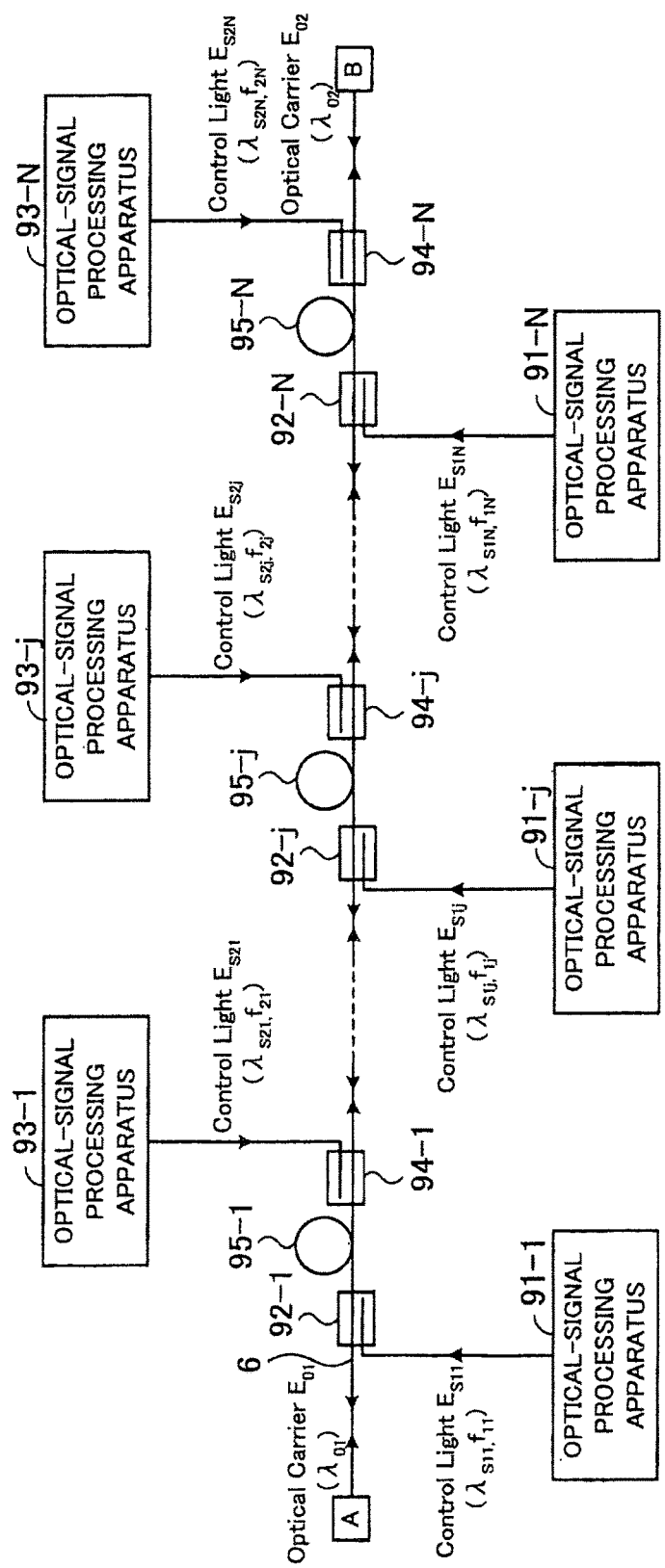
FIG. 22 illustrates an optical network system according to a fifteenth embodiment.

An optical network system according to the fifteenth embodiment is explained below. The optical network system according to the fifteenth embodiment contains a plurality of optical network systems each having the configuration according to the thirteenth embodiment for optical frequency-division multiplexing of data signals. FIG. 22 illustrates the optical network system according to the fifteenth embodiment. In FIG. 22, optical couplers 92-1, . . . , 92-j, . . . , 92-N, 94-1, . . . , 94-j, . . . , 94-N and the nonlinear optical mediums 95-1, . . . , 95-j, . . . , 95-N are arranged in the optical transmission line 6. In addition, optical-signal processing apparatuses 91-1, . . . , 91-j, . . . , 91-N, 93-1, . . . , 93-j, . . . , 93-N are respectively connected to the optical couplers 92-1, . . . , 92-j, . . . , 92-N, 94-1, . . . , 94-j, . . . , 94-N.

The terminals A and B are connected to both ends of the optical transmission line 6. The optical carrier $E_{01}$ having the wavelength $\lambda_{01}$ propagates through the optical transmission line 6 from the terminal A to the terminal B, and the optical carrier $E_{02}$ having the wavelength $\lambda_{02}$ propagates through the optical transmission line 6 from the terminal B to the terminal A. The optical carriers $E_{01}$ and $E_{02}$ are detected in the terminals B and A, respectively.

The subsystem constituted by the optical-signal processing apparatuses 91-1 and 93-1, the optical couplers 92-1 and 94-1, and the nonlinear optical medium 95-1, the subsystem constituted by the optical-signal processing apparatuses 91-j and 93-j, the optical couplers 92-j and 94-j, and the nonlinear optical medium 95-j, and the subsystem constituted by the optical-signal processing apparatuses 91-N and 93-N, the optical couplers 92-N and 94-N, and the nonlinear optical medium 95-N each operate in a similar manner to the optical network system illustrated in FIG. 18. Therefore, the explanations on the operations of each subsystem are not repeated. That is, the N subsystems each being similar to the optical network system illustrated in FIG. 18 are arranged along the optical transmission line 6. Hereinafter, the N subsystems may be referred to as the first, second, . . . , j-th, . . . , N-th subsystems from the left to the right in FIG. 22. Different carrier frequencies are allocated to the optical-signal processing apparatuses 91-1, . . . , 91-j, . . . , 91-N, 93-1, . . . , 93-j, . . . , 93-N for the carrier signals, so that each subsystem outputs control light optically modulated on the basis of a subcarrier-modulated data signal which is modulated by use of a carrier signal having a different frequency.

For example, in the optical transmission in the direction from the terminal A to the terminal B, the frequency $f_{11}$ is allocated for the carrier signal in the first subsystem, the frequency $f_{1j}$ is allocated for the carrier signal in the j-th subsystem, and the frequency $f_{1N}$ is allocated for the carrier signal in the N-th subsystem. The optical-signal processing apparatuses 91-1, . . . , 91-j, . . . , 91-N generate control light $E_{S11}$ to $E_{S1N}$ respectively having the wavelengths $\lambda_{S11}$ and $\lambda_{S1N}$ and being optically modulated on the basis of subcarrier-modulated data signals generated by modulation by use of carrier signals having the different frequencies $f_{11}$ to $f_{1N}$, and inserts the control light $E_{S11}$ to $E_{S1N}$ into the optical transmission line 6 so as to optically combine the control light $E_{S11}$ to $E_{S1N}$ with the optical carrier $E_{01}$. In addition, in the optical transmission in the direction from the terminal B to the terminal A, the frequency $f_{21}$ is allocated for the carrier signal in the first subsystem, the frequency $f_{2j}$ is allocated for the carrier signal in the j-th subsystem, and the frequency $f_{2N}$ is allocated for the carrier signal in the N-th subsystem. The optical-signal processing apparatuses 93-1, ..., 93-j, ..., 93-N generate control light $E_{S21}$ to $E_{S2N}$ respectively having the wavelengths $\lambda_{S21}$ and $\lambda_{S2N}$ and being optically modulated on the basis of subcarrier-modulated data signals generated by modulation by use of carrier signals having the different frequencies $f_{21}$ to $f_{2N}$, and inserts the control light $E_{S21}$ to $E_{S2N}$ into the optical transmission line 6 so as to optically combine the control light $E_{S21}$ to $E_{S2N}$ with the optical carrier $E_{02}$.

Figure 23:
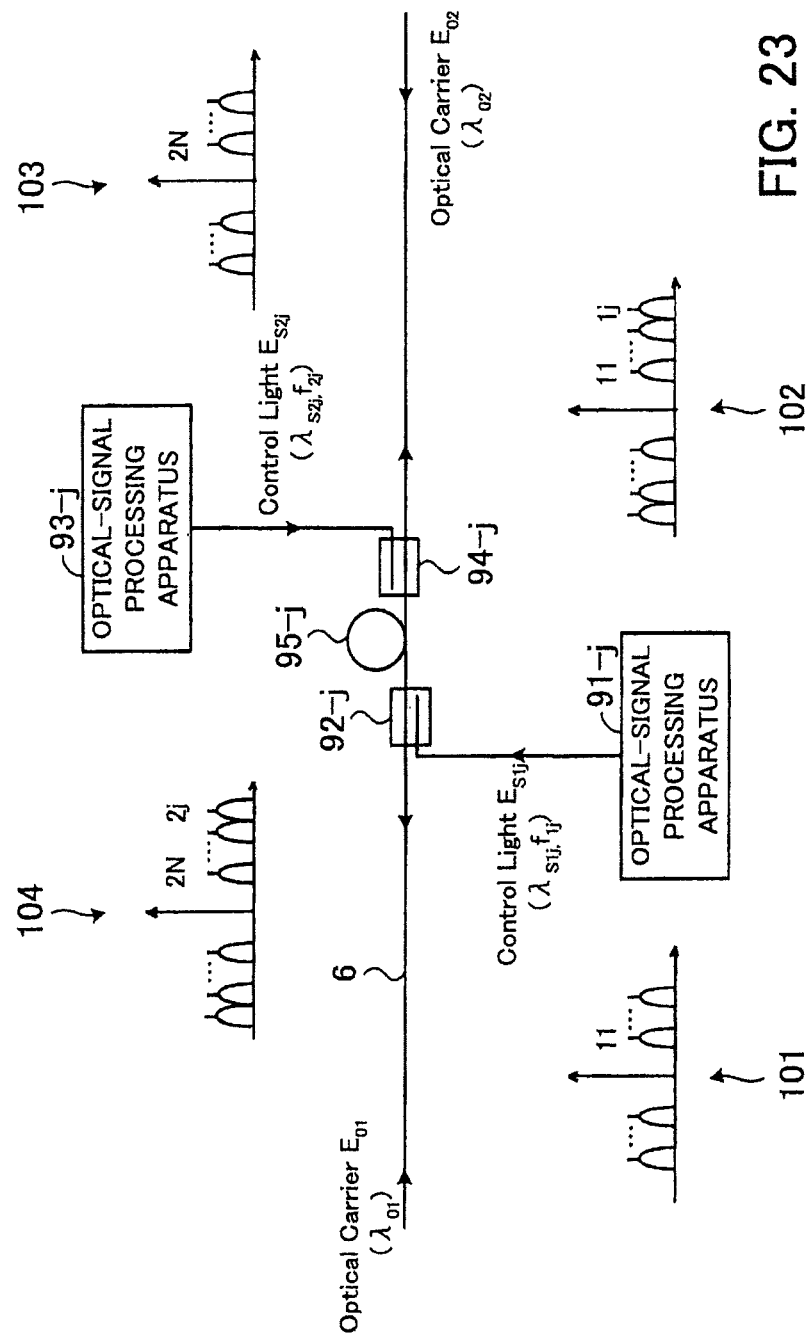
FIG. 23 indicates the spectra of the optical carriers propagating through the optical network of FIG. 22.

FIG. 23 indicates the j-th subsystem illustrated in FIG. 22 and the spectra of the optical carriers $E_{01}$ and $E_{02}$ propagating on the upstream side and downstream side of the j-th subsystem illustrated in FIG. 22 in the direction from the terminal A to the terminal B and in the direction from the terminal B to the terminal A.

In FIG. 23, the reference 101 indicates the spectrum of the optical carrier $E_{01}$ incoming into the j-th subsystem illustrated in FIG. 22 in the direction from the terminal A to the terminal B, and the reference 102 indicates the spectrum of the optical carrier $E_{01}$ outgoing from the j-th subsystem illustrated in FIG. 22 in the direction from the terminal A to the terminal B. In the optical transmission in the direction from the terminal A to the terminal B, the frequency of the carrier signal used in modulation of a j-th data signal to be transmitted from the j-th subsystem toward the terminal B is different from the frequency of the carrier signal used in modulation of the data signal to be transmitted from the (j−1)-th subsystem toward the terminal B. Therefore, a component carrying the j-th data signal is added to the optical carrier $E_{01}$ in the subband indicated by the reference "1j" in the spectrum 102 in FIG. 23. In other words, the arrangement of the j-th subsystem enables addition of the component carrying the j-th data signal (modulated with the carrier signal having the frequency $f_{1j}$) to the optical carrier $E_{01}$.

In FIG. 23, the reference 103 indicates the spectrum of the optical carrier $E_{02}$ incoming into the j-th subsystem illustrated in FIG. 22 in the direction from the terminal B to the terminal A, and the reference 104 indicates the spectrum of the optical carrier $E_{02}$ outgoing from the j-th subsystem illustrated in FIG. 22 in the direction from the terminal B to the terminal A. In the optical transmission in the direction from the terminal B to the terminal A, the frequency of the carrier signal used in modulation of a j-th data signal to be transmitted from the j-th subsystem toward the terminal A is different from the frequency of the carrier signal used in modulation of the data signal to be transmitted from the (j−1)-th subsystem toward the terminal B. Therefore, a component carrying the j-th data signal is added to the optical carrier $E_{02}$ in the subband indicated by the reference "2j" in the spectrum 104 in FIG. 23. In other words, the arrangement of the j-th subsystem enables addition of the component carrying the j-th data signal (modulated with the carrier signal having the frequency $f_{2j}$) to the optical carrier $E_{02}$.

As explained above, the arrangement of the plurality of optical-signal processing apparatuses which respectively use carrier signals having different frequencies enables frequency-division multiplexing of carrier-modulated data signals on the optical carriers En and $E_{02}$ respectively propagating in opposite directions. In addition, the optical network system according to the fifteenth embodiment needs neither more than one optical fiber nor more than one optical carrier having more than one wavelength even in the case where data signals from more than one source are transmitted.

The N subsystems constituting the optical network system according to the fifteenth embodiment are not limited to the optical network system illustrated in FIG. 18, and may be, for example, the optical network system illustrated in FIG. 20.

16. Sixteenth Embodiment

Figure 24:
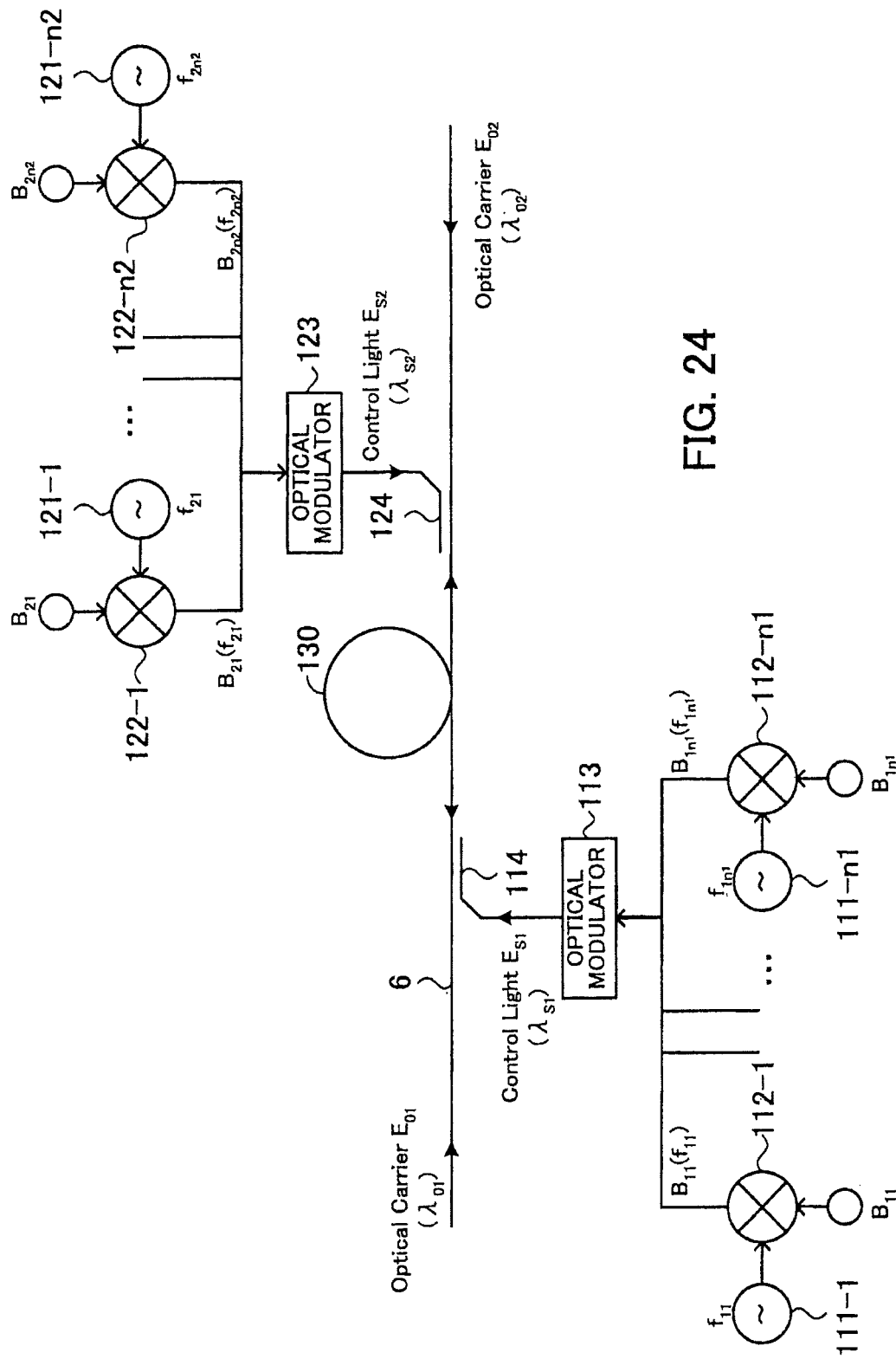
FIG. 24 illustrates an optical network system according to a sixteenth embodiment.

An optical network system according to the sixteenth embodiment is explained below. A plurality of data signals are bidirectionally transmitted from the optical network system according to the sixteenth embodiment. FIG. 24 illustrates the optical network system according to the sixteenth embodiment.

The optical network system of FIG. 24 includes $n_1$ oscillators 111-1 to 111-$n_1$, $n_{21}$ oscillators 121-1 to 121-$n_2$, $n_1$ multipliers 112-1 to 112-$n_1$, $n_2$ multipliers 122-1 to 122-$n_2$, optical modulators 113 and 123, optical couplers 114 and 124, and a nonlinear optical medium 130 are arranged in an optical transmission line 6, and the optical carriers $E_{01}$ and $E_{02}$ having the wavelengths $\lambda_{01}$ and $\lambda_{02}$ propagate through the optical transmission line 6 in opposite directions, respectively.

The oscillators 111-1 to 111-$n_1$ output to the multipliers 112-1 to 112-$n_1$ $n_1$ carrier signals (subcarrier signals in $n_1$ channels) having different RF frequencies $f_{11}$ to $f_{1n1}$, respectively. A plurality of data signals $B_{11}$ to $B_{1n1}$ each representing information to be transmitted through the optical transmission line 6 in a direction (i.e., the direction from the left to the right in FIG. 24) are inputted into the multipliers 112-1 to 112-$n_1$, respectively. The multipliers 112-1 to 112-$n_1$ modulate the subcarrier signals with the data signals $B_{11}$ to $B_{1n1}$, respectively, and obtain and combine a plurality of subcarrier-modulated data signals $B_{11}(f_{11})$ to $B_{1n1}(f_{1n1})$. The combined, subcarrier-modulated data signals are outputted to the optical modulator 113. The optical modulator 113 receives the combined, subcarrier-modulated data signals $B_{11}(f_{11})$ to $B_{1n1}(f_{1n1})$, generates control light $E_{S1}$ having the wavelength $\lambda_{S1}$ and carrying the subcarrier-modulated data signals $B_{11}(f_{11})$ to $B_{1n1}(f_{1n1})$, and outputs the control light $E_{S1}$ to the optical coupler 114. The optical modulator 113 is, for example, the LD 11 illustrated in FIG. 2 or the external optical modulator 3-1 illustrated in FIG. 3.

The optical coupler 114 optically combines the control light $E_{S1}$ with the optical carrier $E_{01}$ propagating through the optical transmission line 6 (connected to the nonlinear optical medium 130). The optical coupler 114 is, for example, a WDM coupler. When the optical carrier $E_{01}$ and the control light $E_{S1}$ are optically combined by the optical coupler 114, the optical carrier $E_{01}$ undergoes cross phase modulation (XPM) with the control light $E_{S1}$ in the nonlinear optical medium 130, so that the subcarrier-modulated data signals $B_{11}(f_{11})$ to $B_{1n1}(f_{1n1})$ are frequency-division multiplexed on the optical carrier $E_{01}$, and the modulated optical carrier $E_{01}$ is outputted onto the optical transmission line 6.

The oscillators 121-1 to 121-$n_2$ output to the multipliers 122-1 to 122-$n_2$ $n_2$ carrier signals (subcarrier signals in $n_2$ channels) having different RF frequencies $f_{21}$ to $f_{22}$, respectively. A plurality of data signals $B_{21}$ to $B_{22}$ each representing information to be transmitted through the optical transmission line 6 in the opposite direction (i.e., the direction from the right to the left in FIG. 24) are inputted into the multipliers 122-1 to 122-$n_2$, respectively. The multipliers 122-1 to 122-$n_2$ modulate the subcarrier signals with the data signals $B_{21}$ to $B_{2n2}$, respectively, and obtain and combine a plurality of subcarrier-modulated data signals $B_{21}$ ($f_{21}$) to $B_{2n2}$ ($f_{2n2}$). The combined, subcarrier-modulated data signals are outputted to the optical modulator 123. The optical modulator 123 receives the combined, subcarrier-modulated data signals $B_{21}$ ($f_{21}$) to $B_{2n2}$ ($f_{2n2}$), generates control light $E_{S2}$ having the wavelength $\lambda_{S2}$ and carrying the subcarrier-modulated data signals $B_{21}(f_{21})$ to $B_{2n2}$ ($f_{2n2}$), and outputs the control light $E_{S2}$ to the optical coupler 124. The optical modulator 123 is, for example, the LD 11 illustrated in FIG. 2 or the external optical modulator 3-1 illustrated in FIG. 3.

The optical coupler 124 optically combines the control light $E_{S2}$ with the optical carrier $E_{O2}$ propagating through the optical transmission line 6 (connected to the nonlinear optical medium 130). The optical coupler 124 is, for example, a WDM coupler. When the optical carrier $E_{O2}$ and the control light $E_{S2}$ are optically combined by the optical coupler 124, the optical carrier $E_{O2}$ undergoes cross phase modulation (XPM) with the control light $E_{S2}$ in the nonlinear optical medium 130, so that the subcarrier-modulated data signals $B_{21}$ ($f_{21}$) to $B_{2n2}$ ($f_{2n2}$) are multiplexed on the optical carrier $E_{O2}$, and the modulated optical carrier $E_{O2}$ is outputted onto the optical transmission line 6.

The optical couplers 114 and 124 have the wavelength characteristics similar to the wavelength characteristics of the optical couplers 82 and 84 in the optical network system of FIG. 18 (which are explained before with reference to FIG. 19). In addition, it is possible to arrange additional optical couplers for splitting off the control light $E_{S1}$ and $E_{S2}$ from the optical carriers $E_{O1}$ and $E_{O2}$, like the optical couplers 82b and 84b in the optical network system of FIG. 20 (which are explained before with reference to FIG. 21).

As explained above, in the optical network system according to the sixteenth embodiment, the optical carrier $E_{O1}$ (propagating through the optical transmission line 6 in a direction) undergo, in the nonlinear optical medium 130, cross phase modulation with the control light $E_{S1}$ carrying the subcarrier-modulated data signals $B_{11}(f_{11})$ to $B_{1n1}(f_{1n1})$, and the optical carrier $E_{O2}$ (propagating through the optical transmission line 6 in the opposite direction) undergo, in the nonlinear optical medium 130, cross phase modulation with the control light $E_{S2}$ carrying the subcarrier-modulated data signals $B_{21}(f_{21})$ to $B_{2n2}$ ($f_{2n2}$). Therefore, the optical network system according to the sixteenth embodiment facilitates bidirectional transmission of a plurality of data signals from an arbitrary position.

Further, it is possible to arrange, in an optical network, more than one optical network system each having the construction illustrated in FIG. 24. For example, it is possible to replace each of the first to N-th subsystems in the optical network system of FIG. 22 with the optical network system of FIG. 24. At this time, the frequencies of the subcarrier signals in each subsystem are allocated so as not to overlap with the frequencies of the subcarrier signals in the other subsystems.

Furthermore, the manner of modulation of the subcarrier signals with the data signals $B_{11}$ to $B_{1n1}$ and $B_{21}$ to $B_{2n2}$ may not be limited to the multiplying using the multipliers 112-1 to 112-$n_1$ and the multipliers 122-1 to 122-n2 as illustrated in FIG. 24, and the data signals $B_{11}$ to $B_{1n1}$ and $B_{21}$ to $B_{2n2}$ may by modulated by amplitude modulation, phase modulation, frequency modulation, or multi-level modulation based on one or a combination of amplitude modulation, phase modulation, and frequency modulation. Moreover, it is possible to modulate the data signals $B_{11}$ to $B_{1n1}$ and $B_{21}$ to $B_{2n2}$ so as to realize orthogonal frequency-division multiplexing.

17. First Variation of Thirteenth Embodiment

An optical network system as a first variation of the thirteenth embodiment is explained below. In the first variation, in advance, the optical carrier $E_{O2}$ is optically combined with the optical carrier $E_{O1}$ in a first terminal, and is then transmitted to a second terminal, which is located on the downstream side of the optical carrier $E_{O1}$.

Figure 25:
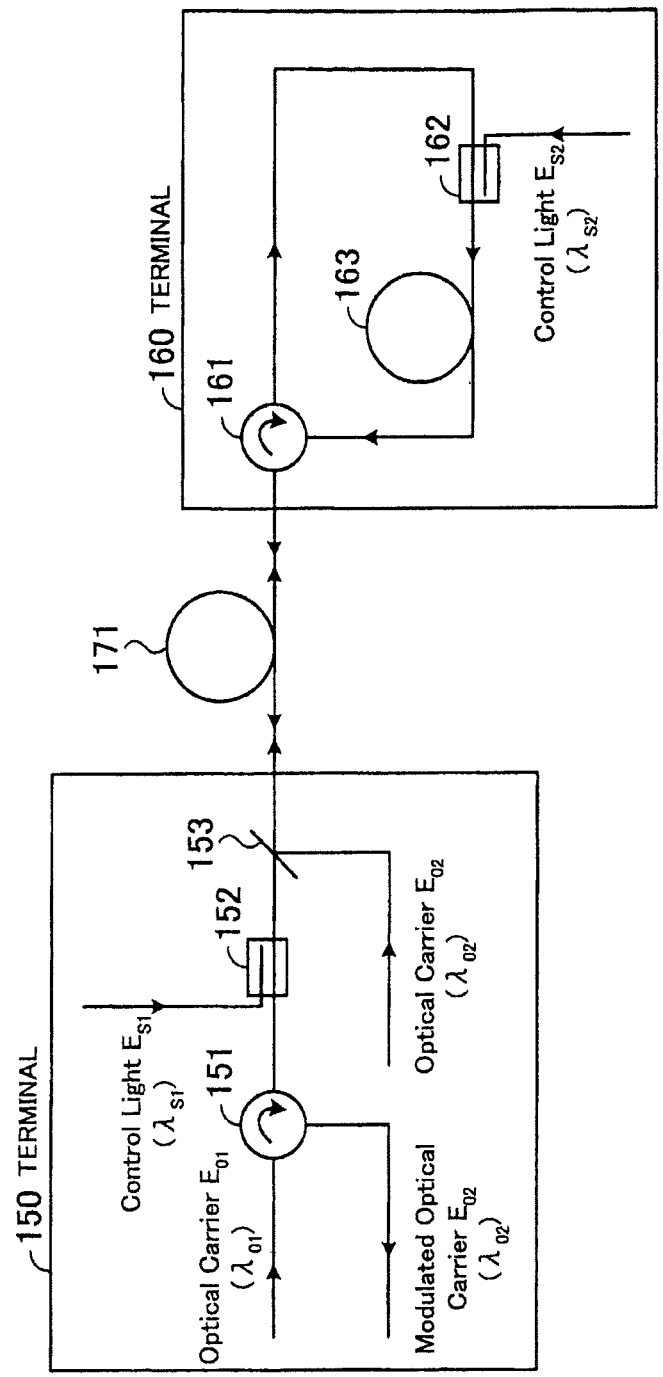
FIG. 25 illustrates a first variation of the optical network system of FIG. 18.

FIG. 25 illustrates the optical network system as the first variation of the optical network system of FIG. 18. The optical network system illustrated in FIG. 25 comprises terminals 150 and 160 and an optical fiber 171 connecting the terminals 150 and 160.

The terminal 150 comprises a circulator 151, an optical coupler 152, and an optical combiner 153. The optical coupler 152 is, for example, a WDM coupler.

The optical carrier $E_{O1}$ is inputted from a light source into the circulator 151 in the terminal 150, where the optical carrier $E_{O1}$ has the wavelength $\lambda_{O1}$. Although not shown, the light source is provided in the terminal 150. The circulator 151 receives the optical carrier $E_{O1}$ and outputs the optical carrier $E_{O1}$ to the optical coupler 152. The circulator 151 also receives the optical carrier $E_{O2}$ which is transmitted from the terminal 160 and modulated. The circulator 151 outputs the modulated optical carrier $E_{O2}$ from a port which is different from the port through which the optical carrier $E_{O1}$ is received.

The optical coupler 152 optically combines control light $E_{S1}$ with the optical carrier $E_{O1}$. The control light $E_{S1}$ is outputted from an optical-signal processing apparatus (not shown) in the terminal 150. For example, the optical-signal processing apparatus has a construction similar to the optical-signal processing apparatus 81 illustrated in FIG. 18. The optical carrier $E_{O1}$ undergoes cross phase modulation with control light $E_{S1}$ in the optical fiber 171 or in the nonlinear fiber (not shown), so that a modulated data signal is multiplexed on the optical carrier $E_{O1}$.

The optical combiner 153 optically combines the optical carrier $E_{O2}$ with the optical carrier $E_{O1}$ outputted from the optical coupler 152. Although not shown, another light source which outputs the optical carrier $E_{O2}$ is provided in the terminal 150.

The terminal 160 comprises a circulator 161, an optical coupler 162, and an optical fiber 163. The optical coupler 162 is, for example, a WDM coupler.

The optical carrier $E_{O2}$ which is optically combined with the optical carrier $E_{O1}$ in the terminal 150 and transmitted to the terminal 160 is inputted into the circulator 161 in the terminal 160. The circulator 161 receives the optical carrier $E_{O2}$ and outputs the optical carrier $E_{O2}$ to the optical coupler 162. In addition, the circulator 161 also receives an optical carrier $E_{O2}$ which is cross-phase modulated in the optical fiber 163, and outputs the cross-phase-modulated optical carrier $E_{O2}$ to the optical fiber 171.

The optical coupler 162 optically combines control light $E_{S2}$ with the optical carrier $E_{O2}$ outputted from the circulator 161, where the control light $E_{S2}$ is outputted from an optical-signal processing apparatus (not shown) in the terminal 160. For example, the optical-signal processing apparatus has a construction similar to the optical-signal processing apparatus 83 illustrated in FIG. 18. The optical carrier $E_{O2}$ optically combined with the control light $E_{S2}$ undergoes cross phase modulation with control light $E_{S2}$ in the optical fiber 163, so that a modulated data signal is multiplexed on the optical carrier $E_{02}$.

The optical fiber 163 is an optical fiber provided for modulation. In the optical fiber 163, the modulated data signal is multiplexed on the optical carrier $E_{02}$ by the cross phase modulation. The cross-phase-modulated optical carrier $E_{02}$ is outputted to the circulator 161.

In the example of FIG. 25, the optical carrier $E_{02}$ is optically combined with the optical carrier $E_{01}$ in the terminal 150, and is then transmitted from the terminal 150 to the terminal 160 through the optical fiber 171. The optical carrier $E_{02}$ transmitted to the terminal 160 is optically combined with the control light $E_{S2}$ in the terminal 160, and the modulated data signal is multiplexed on the optical carrier $E_{02}$ by the cross phase modulation in the optical fiber 163. The cross-phase-modulated optical carrier $E_{02}$ is transmitted through the optical fiber 171 to the terminal 150. The arrangement of FIG. 25 can be used in the case where the light source for the optical carrier $E_{02}$ is desired to be arranged in the terminal 150 instead of the terminal 160.

Further, it is possible to split the optical carrier $E_{02}$ from the optical carrier $E_{01}$ before the control light $E_{S2}$ is optically combined with the optical carrier $E_{02}$. Furthermore, it is possible to arrange additional optical couplers on both sides of the optical fiber 171 as the optical couplers 82b and 84b arranged on both sides of the optical fiber 171 in the optical network system of FIG. 20.

18. Second Variation of Thirteenth Embodiment

Figure 26:
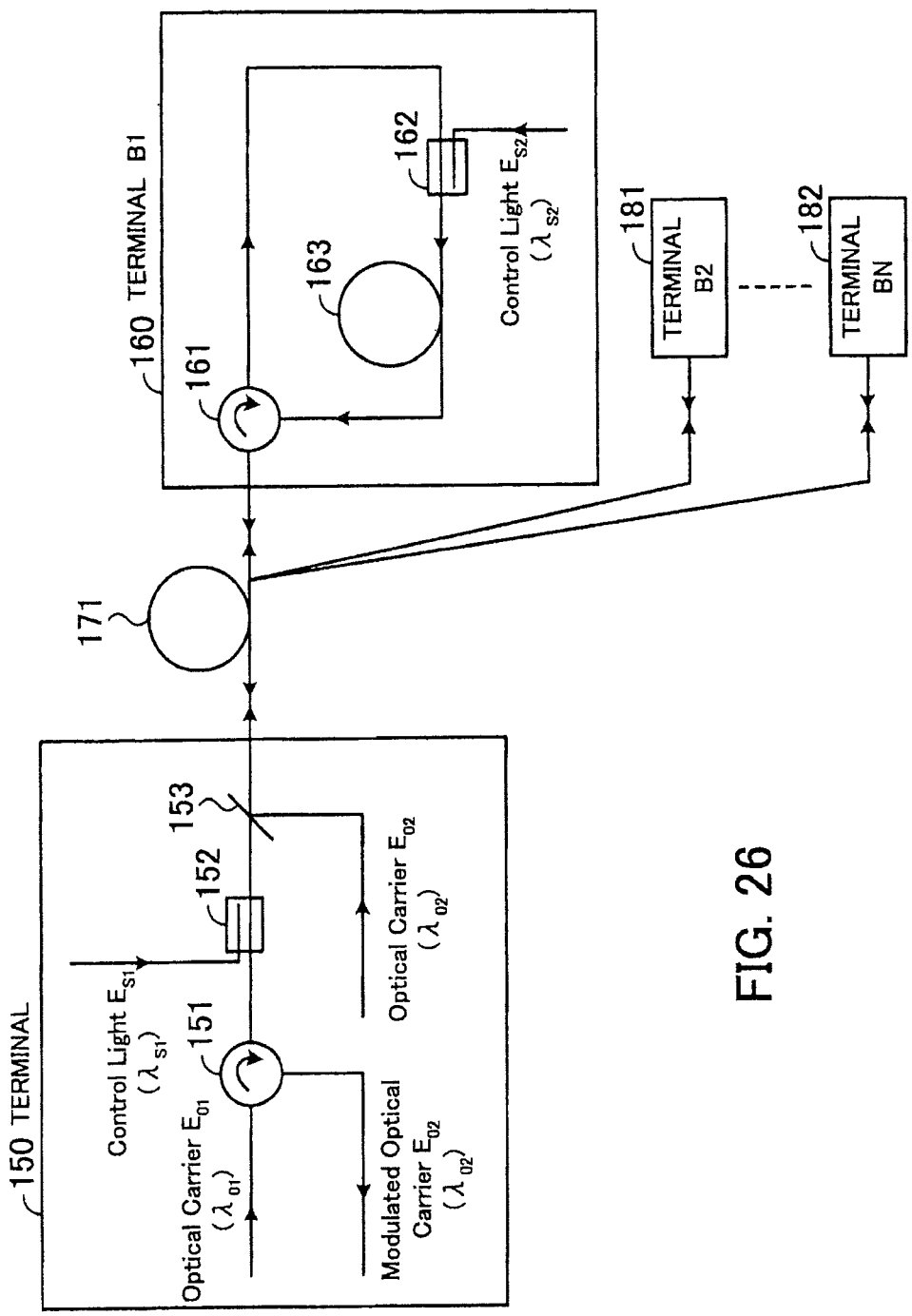
FIG. 26 illustrates a further variation of the optical network system of FIG. 25.

An optical network system as a second variation of the thirteenth embodiment is explained below. The second variation is a further variation of the optical network system of FIG. 25. FIG. 26 illustrates the second variation of the optical network system of FIG. 18. The second variation is different from the first variation in that N terminals B1, B2, . . . , BN including the terminal 160 are arranged opposite to the terminal 150 in the second variation. In FIG. 26, the terminal 160 corresponds to the terminal B1, and the terminals B2 and BN respectively bear the references 181 and 182. Each of the terminals B1, B2, . . . , BN contains an optical-signal processing apparatus (not shown). In the arrangement of FIG. 26, optical signals transmitted from the terminal 150 through the optical fiber 171 are distributed to the N terminals B1, B2, . . . , BN. As explained for the fifteenth and sixteenth embodiments, different frequencies are allocated for the carrier signals to the optical-signal processing apparatuses in the terminals B1, B2, . . . , BN. That is, the control light with which the optical carrier $E_{02}$ is cross-phase modulated in each of the terminals B1, B2, . . . , BN is optically modulated on the basis of a subcarrier modulated data signal which is modulated with a carrier signal having a different frequency.

In the optical network system of FIG. 26, the terminal 150 transmits data to the N terminals B1, B2, . . . , BN by using the optical carrier $E_{01}$, and also transmits the optical carrier $E_{02}$ to the N terminals B1, B2, . . . , BN by optically combining the optical carrier $E_{02}$ with the optical carrier $E_{01}$. Then, each of the terminals B1, B2, . . . , BN multiplexes data on the optical carrier $E_{02}$ by using the control light, and the optical carrier $E_{02}$ on which the data is multiplexed and which is outputted from each of the terminals B1, B2, . . . , BN undergoes power combining, and is transmitted through the optical fiber 171 to the terminal 150, where the multiplexing of the data is realized in each of the terminals B1, B2, . . . , BN by cross phase modulation with the control light, which is modulated by using a different carrier frequency.

19. Third Variation of Thirteenth Embodiment

Figure 27:
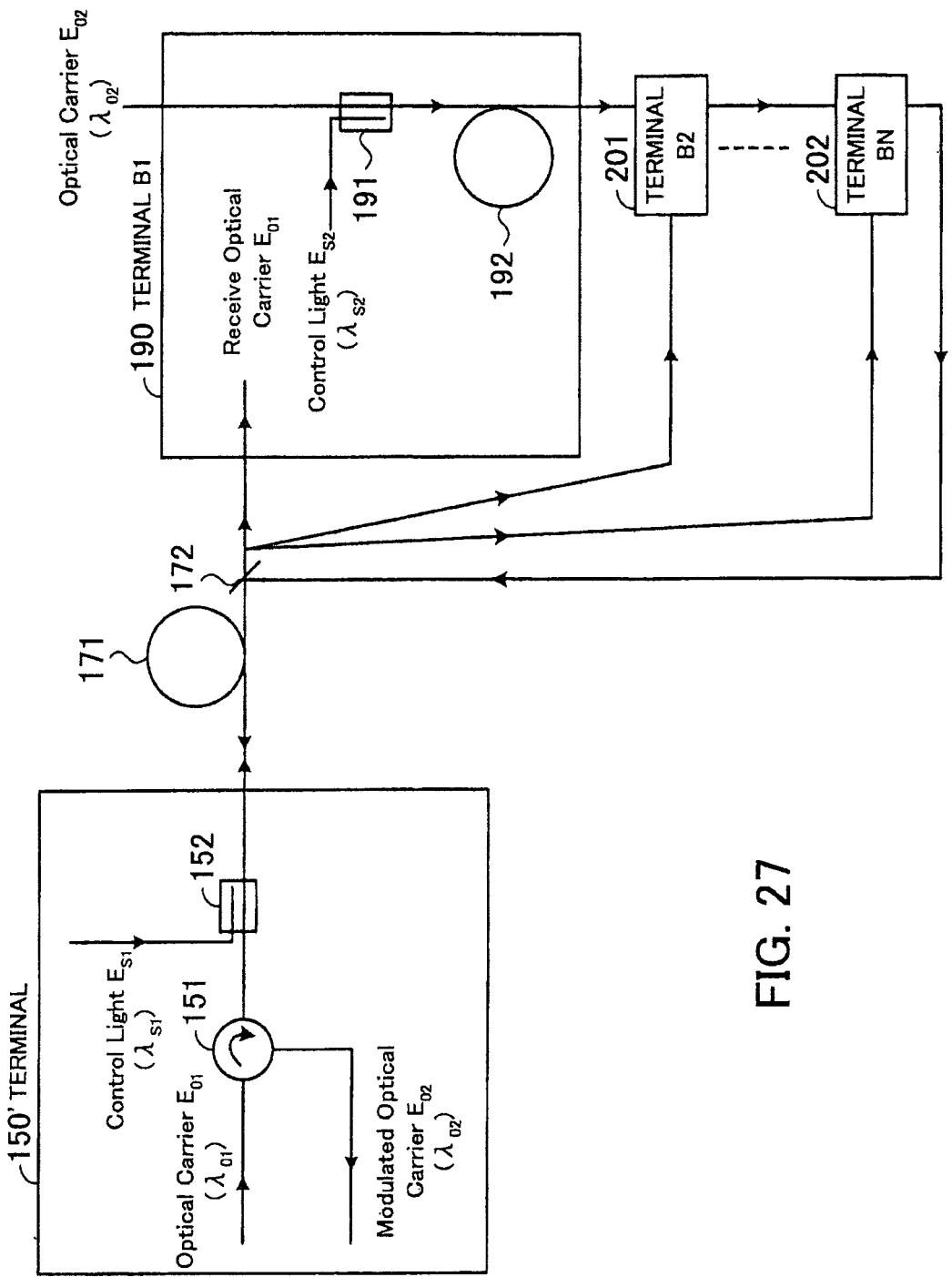
FIG. 27 illustrates a second variation of the optical network system of FIG. 18.

An optical network system as a third variation of the thirteenth embodiment is explained below. The third variation is a further variation of the optical network system of FIG. 25. FIG. 27 illustrates the third variation of the optical network system of FIG. 18. The third variation is different from the first variation in that N terminals B1, B2, . . . , BN are arranged opposite to the terminal 150' in the third variation. In FIG. 27, the terminals B1, B2, and BN respectively bear the references 190, 201, and 202. In the optical network system of FIG. 27, optical signals transmitted from the terminal 150' through the optical fiber 171 are distributed to the N terminals B1, B2, . . . , BN.

Each of the terminals B1, B2, . . . , BN contains an optical-signal processing apparatus (not shown). As explained for the fifteenth and sixteenth embodiments, different frequencies are allocated for the carrier signals to the optical-signal processing apparatuses in the terminals B1, B2, . . . , BN. That is, control light with which the optical carrier $E_{02}$ is cross-phase modulated in each of the terminals B1, B2, . . . , BN is optically modulated on the basis of a subcarrier modulated data signal which is modulated with a carrier signal having a different frequency.

The terminal 150' in the optical network system of FIG. 27 is different from the terminal 150 in the optical network system of FIG. 25 in that the terminal 150' does not comprise the optical combiner 153, i.e., the terminal 150' does not optically combine the optical carrier $E_{02}$ with the optical carrier $E_{01}$ and does not transmit the optical carrier $E_{02}$.

The terminal B1 receives the optical carrier $E_{01}$ from the terminal 150' through the optical fiber 171 and comprises an optical coupler 191 and an optical fiber 192.

The optical coupler 191 optically combines the control light $E_{S2}$ (having the wavelength $\lambda_{S2}$) with the optical carrier $E_{02}$ (having the wavelength $\lambda_{02}$), where the control light $E_{S2}$ is outputted from an optical-signal processing apparatus arranged in the terminal B1. For example, the optical-signal processing apparatus has a construction similar to the optical-signal processing apparatus 83 illustrated in FIG. 18. The optical carrier $E_{02}$ may be externally inputted into the terminal B1, or the terminal B1 may comprise a light source which outputs the optical carrier $E_{02}$. The optical carrier $E_{02}$ optically combined with the control light $E_{S2}$ undergoes cross phase modulation with the control light $E_{S2}$ in the optical fiber 192, so that the modulated data signal is frequency-division multiplexed on the optical carrier $E_{02}$.

The optical fiber 192 is an optical fiber provided for modulation. In the optical fiber 192, the modulated data signal is frequency-division multiplexed on the optical carrier $E_{02}$ by the cross phase modulation. The cross-phase-modulated optical carrier $E_{02}$ is outputted to the terminal B2.

Each of the terminals B2, . . . , BN receives the optical carrier $E_{01}$ from the terminal 150' through the optical fiber 171 and comprises an optical coupler similar to the optical coupler 191 and an optical fiber similar to the optical fiber 192. In addition, each terminal Bj (j=2 to N) receives from the terminal Bj−1 the optical carrier $E_{02}$ (which is cross-phase modulated in the terminal Bj−1). The optical coupler in each terminal Bj optically combines the control light (which is outputted from the optical-signal processing apparatus in the terminal Bj) with the optical carrier $E_{02}$ received from the terminal Bj−1. The optical carrier $E_{02}$ optically combined with the control light undergoes cross phase modulation in the optical fiber in the terminal Bj, so that a modulated data signal is multiplexed on the optical carrier $E_{02}$. The optical carrier $E_{02}$ which is cross-phase modulated in each terminal Bj (j=1 to N−1) is transmitted to the terminal Bj+1, and finally the optical carrier $E_{O2}$ which is cross-phase modulated in the terminal BN is transmitted to the optical fiber 171 through an optical coupler 172, which is arranged in the optical fiber 171.

Thus, each of the terminals B1, B2, ..., BN multiplexes data on the optical carrier $E_{O2}$ by using the control light, the optical carrier $E_{O2}$ on which the data is multiplexed in each terminal Bj (j=1 to N−1) is transmitted to the next terminal Bj+1, and finally the optical carrier $E_{O2}$ on which the data is multiplexed in the terminal BN is transmitted through the optical fiber 171 to the terminal 150', where the multiplexing of the data is realized in each of the terminals B1, B2, ..., BN by the cross phase modulation with the control light modulated by using a different carrier frequency.

Although, in the optical network system of FIG. 27, the optical fiber for modulation is arranged in each of the N terminals B1, B2, ..., BN in order to perform cross phase modulation and realize frequency-division multiplexing, alternatively, it is possible to arrange in the terminal BN a common optical fiber for modulation, collect the control light from each of the terminals B1, B2, ..., BN−1 into the terminal BN, and perform cross phase modulation with the control light from each of the terminals B1, B2, ..., BN−1 in the common optical fiber in the terminal BN so as to realize the optical frequency-division multiplexing.

20. Seventeenth Embodiment

Figure 28:
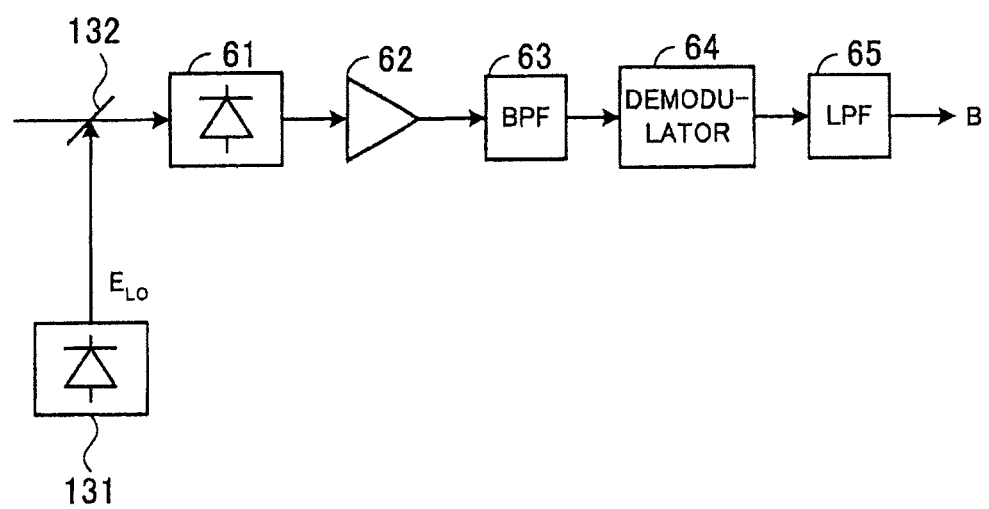
FIG. 28 illustrates a receiver according to a seventeenth embodiment.

A receiver according to the seventeenth embodiment is explained below. FIG. 28 illustrates the receiver according to the seventeenth embodiment. The receiver of FIG. 28 is different from the receiver illustrated in FIG. 9 in comprising a laser diode (LD) 131 and an optical combiner 132 in addition to the constituents of the receiver of FIG. 9. The LD 131 outputs local light $E_{LO}$, and the optical combiner 132 optically combines the local light $E_{LO}$ with optical carrier $E_{O1}$ or $E_{O2}$ which is to be received by the PD 61. The frequency of the local light $E_{LO}$ is differentiated from the frequency of the optical carrier $E_{O1}$ or $E_{O2}$ by a desired detuning frequency ($f_{tf}$). In this case, the PD can output an electric signal in an intermediate frequency range.

Thus, the receiver of FIG. 28 can demodulate the electric signal and obtain one or more data signals which are cross-phase modulated in a nonlinear optical medium with the control light optically modulated on the basis of one or more subcarrier-modulated data signals.

Further, the receiver of FIG. 28, as well as the receivers of FIGS. 9 and 11, can be used in either of unidirectional transmission and bidirectional transmission.

21. Eighteenth Embodiment

An optical-signal processing apparatus according to the eighteenth embodiment is explained below. The eighteenth embodiment is characterized in feedback processing performed in the optical-signal processing apparatus.

Figure 29:
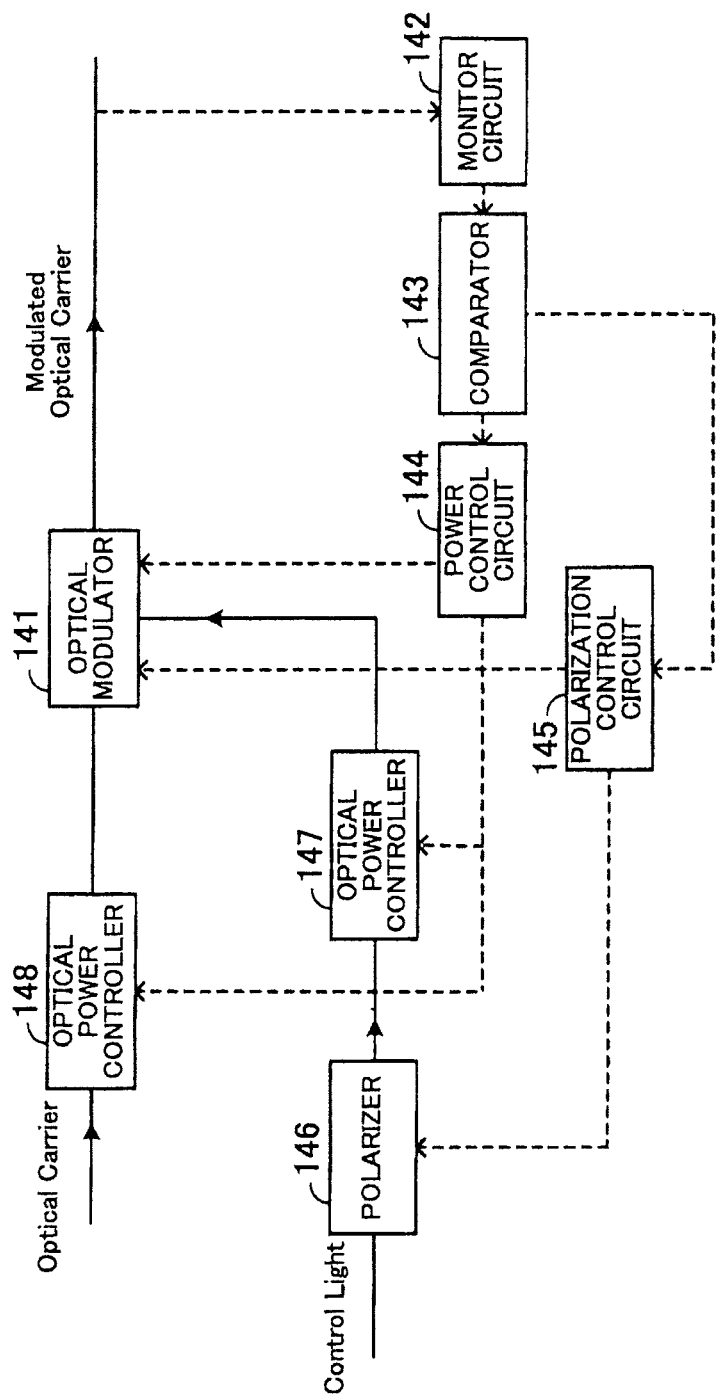
FIG. 29 illustrates an optical-signal processing apparatus according to an eighteenth embodiment.

FIG. 29 illustrates the optical-signal processing apparatus according to the eighteenth embodiment. The optical-signal processing apparatus of FIG. 29 comprises an optical modulator 141, a monitor circuit 142, a comparator 143, a power control circuit 144, a polarization control circuit 145, a polarizer 146, and optical power controllers 147 and 148.

The optical modulator 141 corresponds to, for example, the nonlinear optical medium 5 illustrated in FIG. 1. The monitor circuit 142 monitors the quality of a modulated optical carrier outputted from the optical modulator 141. The monitor circuit 142 comprises a filter and a light-receiving element. The filter extracts a portion having the wavelengths of the modulated optical carrier from the output of the optical modulator 141, and the light-receiving element receives the optical carrier filtered by the filter. The comparator 143 calculates an operational characteristic of the optical carrier on the basis of the optical power, the waveform, the spectrum, and the like of the optical carrier monitored by the monitor circuit 142, and compares the calculated operational characteristic with a predetermined threshold.

The optical power controller 147 controls the optical power of control light which is to be used in the cross phase modulation in the optical modulator 141, and the optical power controller 148 controls the optical power of the optical carrier to be inputted into the optical modulator 141. The power control circuit 144 controls the optical power of the optical carrier and the control light on the basis of the result of the comparison made by the comparator 143. Specifically, the power control circuit 144 controls the optical power controllers 147 and 148.

The polarizer 146 receives the control light to be used in the cross phase modulation in the optical modulator 141, and controls the polarization states of the control light, under control of the polarization control circuit 145. The polarization control circuit 145 controls the polarization states of the optical carrier and the control light which are used in the cross phase modulation in the optical modulator 141, on the basis of the result of the comparison made by the comparator 143. The polarization control circuit 145 controls the polarizer 146 on the basis of the result of the comparison made by the comparator 143 in order to control the polarization state of the control light. In addition, the polarization control circuit 145 controls another polarizer (not shown) which is arranged in the optical modulator 141 and can change the polarization state of the optical carrier.

In the optical-signal processing apparatus according to the eighteenth embodiment, feedback control of the power and polarization state of the control light and the optical carrier is performed as explained above. Therefore, the optical modulator 141 can output an appropriately modulated optical carrier.

22. Cross Phase Modulation

The cross phase modulation in the optical fiber is explained below. In the following explanations, the length of the optical fiber is indicated by L, and the loss in the optical fiber is indicated by α. In addition, it is assumed that the optical carrier and the control light are in an identical polarization state. In this case, the optical carrier undergoes a phase modulation with the magnitude $\phi(L)$ expressed by the formula (1).

$$\phi(L) = \gamma P_{Ct}(0) l(L) \qquad (1)$$

In the formula (1), $P_{Ct}(0)$ denotes the optical power of the control light, l(L) denotes the nonlinear interaction length and is expressed by the formula (2), and γ denotes a third-order nonlinear coefficient and is expressed by the formula (3).

$$l(L) = (1 - e^{-\alpha L})/\alpha L \qquad (2)$$

$$\gamma = \frac{\omega n_2}{c A_{\mathit{eff}}} \qquad (3)$$

In the formula (3), $n_2$ denotes the nonlinear refraction index in the optical fiber, and $A_{\mathit{eff}}$ denotes the effective cross section of the optical fiber.

The cross phase modulation with the control light expressed as above can modulate the optical carrier, where the magnitude $\phi(L)$ of the phase modulation can be determined on the basis of the intensity of the control light and the nonlinear coefficient and the length of the optical fiber.

The WDM coupler or the like is used in the optical combining of the optical carrier and the control light. In addition, in order to extract the modulated optical carrier from the output end of the optical fiber, an optical band-pass filter, a band-stop filter (which cuts off the components (e.g., the control light) not having the wavelengths of the optical carrier), a WDM coupler, and the like can be used. In particular, the WDM coupler, in which transmission loss is small, can achieve optical combining and splitting of the control light with almost no influence on the optical carrier.

The optical fiber used in the cross phase modulation has a length sufficient for producing the nonlinear optical effect. For example, the so-called highly-nonlinear fibers (HNLFs) having the nonlinear coefficients of 10 to 30 $(W \cdot km)^{-1}$ are already in the practical use. Therefore, the modulation of the optical carrier can be realized by using the highly-nonlinear fiber having the length of tens to hundreds of meters and control light having the power of approximately 10 mW.

Further, it is possible to determine a predetermined portion of the optical fiber (as the optical transmission line) having an appropriate length, arrange WDM couplers on both sides of the predetermined portion, and multiplex a data signal on an optical carrier by using the nonlinear optical effect in the optical fiber. Since the nonlinear coefficients of the common optical fibers are approximately 2 $(W \cdot km)^{-1}$, the modulation of the optical carrier can be realized in the predetermined portion of the optical fiber when the predetermined portion has the length of approximately 100 m to 1 km. In the case where one or more portions of optical fibers in an actual optical network or an optical link can be used as a cross phase modulator, an optical carrier can be modulated at an arbitrary position in the optical network or optical link. Even in such an optical network or optical link, optical carriers are not affected when no control light is inserted. Therefore, the optical network or optical link in which the above arrangement for the cross phase modulation is provided matches well with the conventional optical networks.

In particular, in the case where mediums in which the nonlinear optical effect is enhanced are used, for example, the following optical fibers or waveguide structures (1) to (5) can be used as the optical fibers.

(1) The highly-nonlinear fiber (HNLF)

(2) The optical fibers or waveguide structures in which the nonlinear refraction index is increased by doping the core with germanium, bismuth, or the like (3) The optical fibers or waveguide structures in which the optical power density is increased by reducing the mode field (4) The optical fibers or waveguide structures using chalcogenide glass (5) The photonic crystal fibers or photonic crystal waveguide structures In addition, the semiconductor optical amplifier having a quantum-well structure, the quantum-dot semiconductor optical amplifier, the silicon-photonics type waveguide, and the like can be used as nonlinear optical mediums. Further, devices causing a second-order nonlinear optical effect such as three-wave mixing can be used as a nonlinear optical medium. In this case, the devices causing a second-order nonlinear optical effect may use a $LiNbO_3$ waveguide, a GaAlAs device, a second-order nonlinear optical crystal, or the like having a quasi-phase-matched structure. Even in the case where a second-order nonlinear medium is used, it is preferable that the wavelengths are allocated so as to realize phase matching.

23. Additional Matters

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention have been described in detail, it should be understood that the various changes, substitutions and alterations could be made hereto without departing from the spirit and scope of the invention.

What is claimed is:

1. An optical network system comprising:
   a nonlinear optical medium through which a first optical carrier having a first wavelength and a second optical carrier having a second wavelength propagate in opposite directions, the nonlinear optical medium configured to connect a first terminal and a second terminal and the first optical carrier propagating from the first terminal to the second terminal and the second optical carrier propagating from the second terminal to the first terminal;
   the first terminal including:
      an optical modulator which generates a modulated light based on a combined signal generated by combining a baseband signal with an RF (radio frequency) signal, multiplexes the modulated light on the first optical carrier and transmits the modulated light to the second terminal via the nonlinear optical medium, the RF signal being generated by modulating a carrier signal with an information;
   the second terminal splits the modulated light from the first optical carrier and receives the RF signal or the baseband signal, multiplexes modulated data signals on the second optical carrier and transmits the modulated data signals to the first terminal via the nonlinear optical medium,
   wherein the first terminal splits the modulated data signals from the second optical carrier and receives the modulated data signals.

* * * * *